(12) United States Patent
Wai et al.

(10) Patent No.: US 7,382,113 B2
(45) Date of Patent: Jun. 3, 2008

(54) HIGH-EFFICIENCY HIGH-VOLTAGE DIFFERENCE RATIO BI-DIRECTIONAL CONVERTER

(75) Inventors: Rong-Jong Wai, Liouying Township, Tainan County (TW); Rou-Yong Duan, Guosing Township, Nantou County (TW)

(73) Assignee: Yuan Ze University, Taoyuan (TW)

( * ) Notice: Subject to any disclaimer, the term of this patent is extended or adjusted under 35 U.S.C. 154(b) by 89 days.

(21) Appl. No.: 11/377,418

(22) Filed: Mar. 17, 2006

(65) Prior Publication Data

US 2007/0216390 A1    Sep. 20, 2007

(51) Int. Cl.
*G05F 1/613* (2006.01)
(52) U.S. Cl. .................... 323/222; 323/266
(58) Field of Classification Search ............. 323/222, 323/266, 271, 282, 351
See application file for complete search history.

(56) References Cited

U.S. PATENT DOCUMENTS

| | | | | |
|---|---|---|---|---|
| 4,736,151 | A * | 4/1988 | Dishner ..................... | 323/224 |
| 6,294,900 | B1 * | 9/2001 | Greenwood et al. ........ | 323/222 |
| 6,320,358 | B2 * | 11/2001 | Miller ........................ | 323/222 |
| 6,400,579 | B2 * | 6/2002 | Cuk ............................ | 363/16 |
| 6,717,388 | B2 * | 4/2004 | Smidt et al. ................ | 323/271 |
| 7,161,331 | B2 * | 1/2007 | Wai et al. ................... | 323/222 |
| 2006/0226816 | A1 * | 10/2006 | Wai et al. ................... | 323/222 |

* cited by examiner

*Primary Examiner*—Jeffrey Sterrett

(57) ABSTRACT

The aim of this invention focuses on the development of a high-efficiency bidirectional converter for power sources with great voltage diversity. In traditional bidirectional converters, the circuit topology with transformer form is the common usual. Moreover, the soft-switching techniques including zero-voltage-switching (ZVS) or zero-current-switching (ZCS) are usually used for alleviating the corresponding switching losses. However, there are four and upward power semiconductor switches in these circuit schemes. By this way, it will result in the increase of production cost, and the degeneration of conversion efficiency. The coupled-inductor bidirectional scheme in the proposed converter only adopts three power semiconductor switches to accomplish the objective of bidirectional current control. Under the situation of non-isolation circuit topology, it still possesses the protection of electric safety for operators. Due to the characteristics of high step-up and step-down ratio, the battery module with low voltage could be injected into a high-voltage dc bus for the later utilization, e.g., high-voltage load, front-end of inverter. Since the techniques of voltage clamping, synchronous rectification and soft switching are manipulated in this circuit topology, and the corresponding device specifications are adequately performed, it can achieve the goal of high-efficiency bidirectional power conversion for power sources with great voltage diversity.

6 Claims, 21 Drawing Sheets equivalent circuit (a)

Mold1 (b)

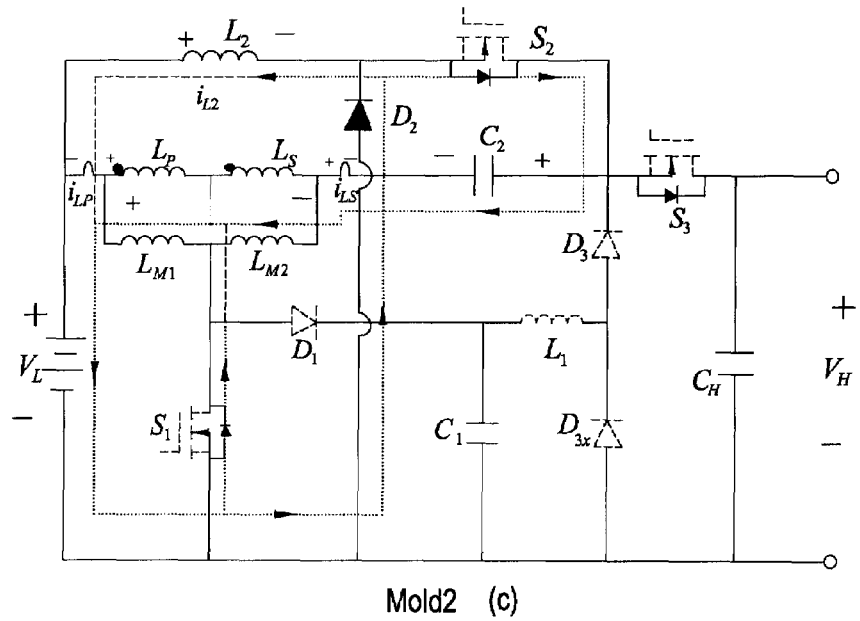
Mold2 (c)
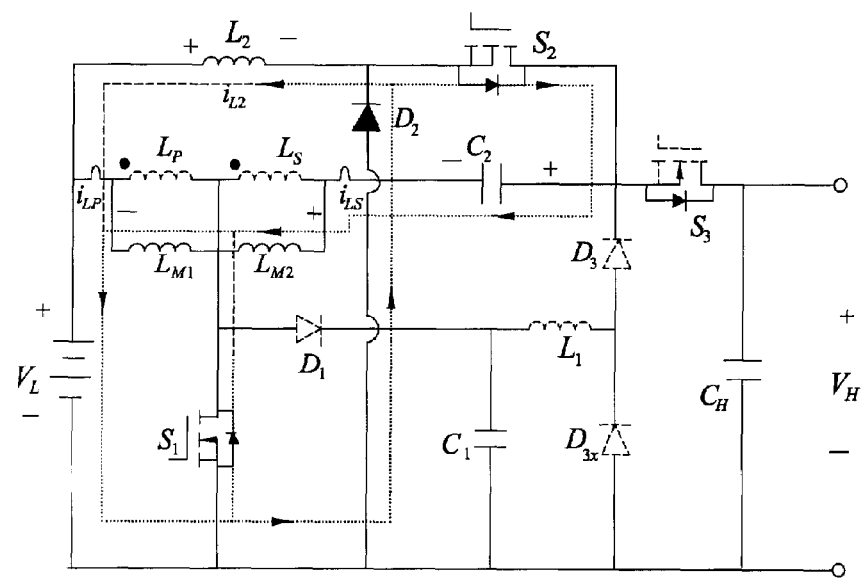
Mold3 (d)
*FIG.3(Continuation)*

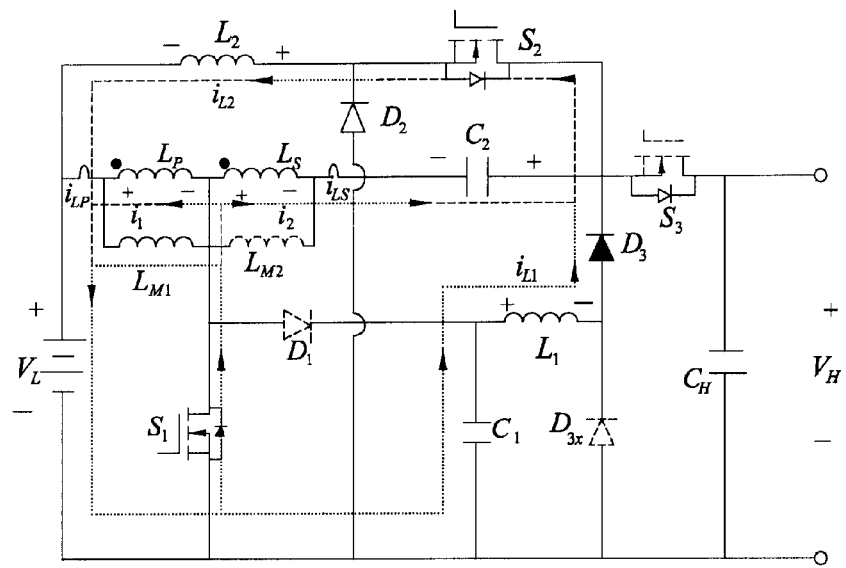
Mold4 (e)
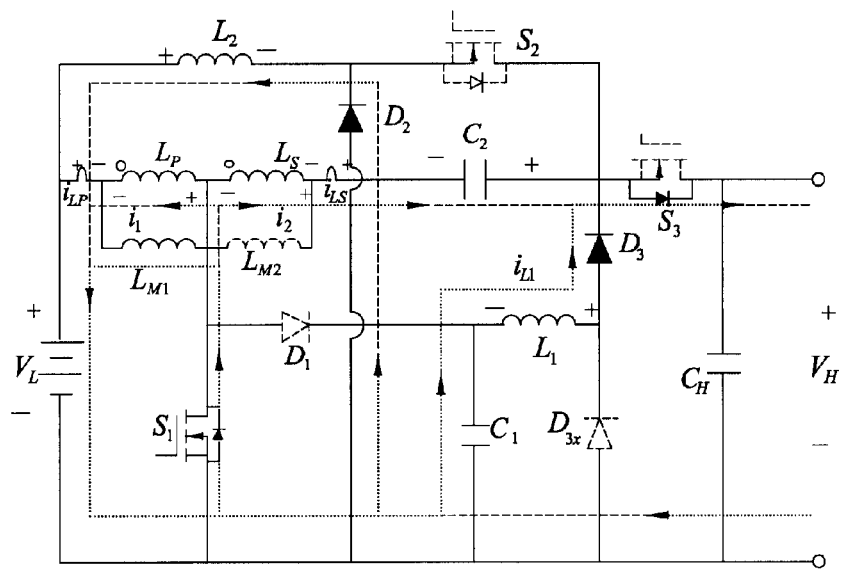
Mold5 (f)
FIG.3(Continuation)

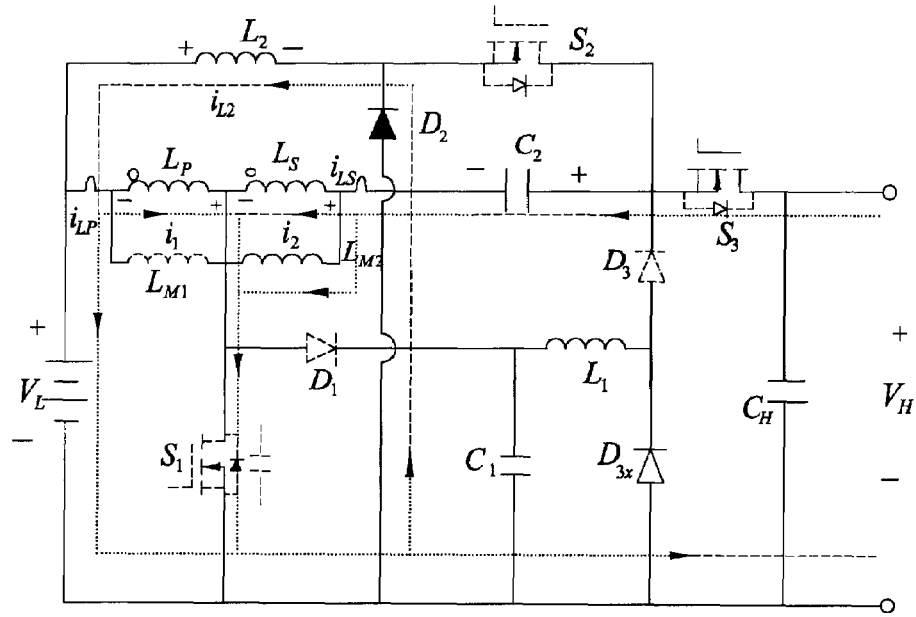
Mold6 (g)
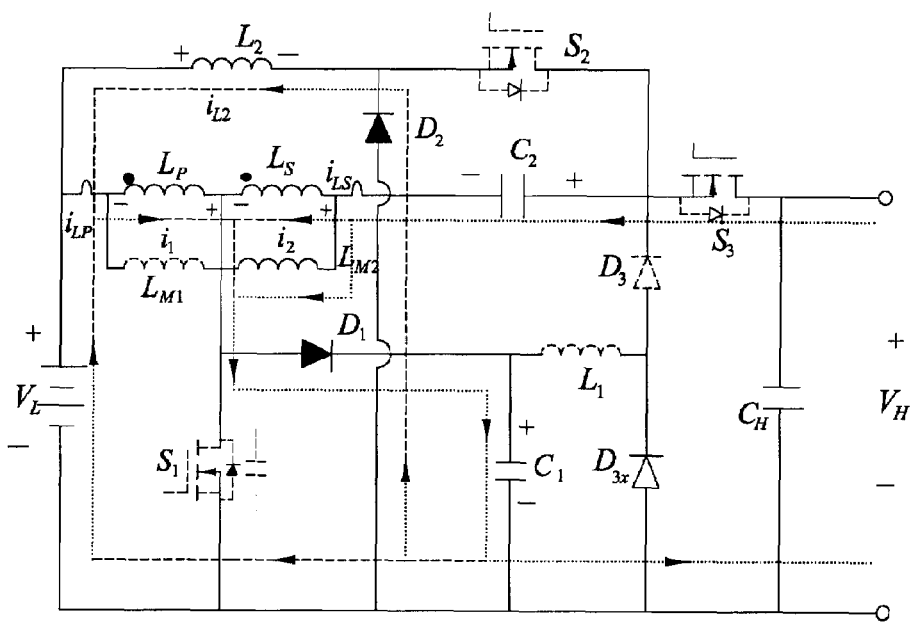
Mold7 (h)
FIG.3(Continuation)

(a)

(b)

Mold1 (a)

Mold2 (b)

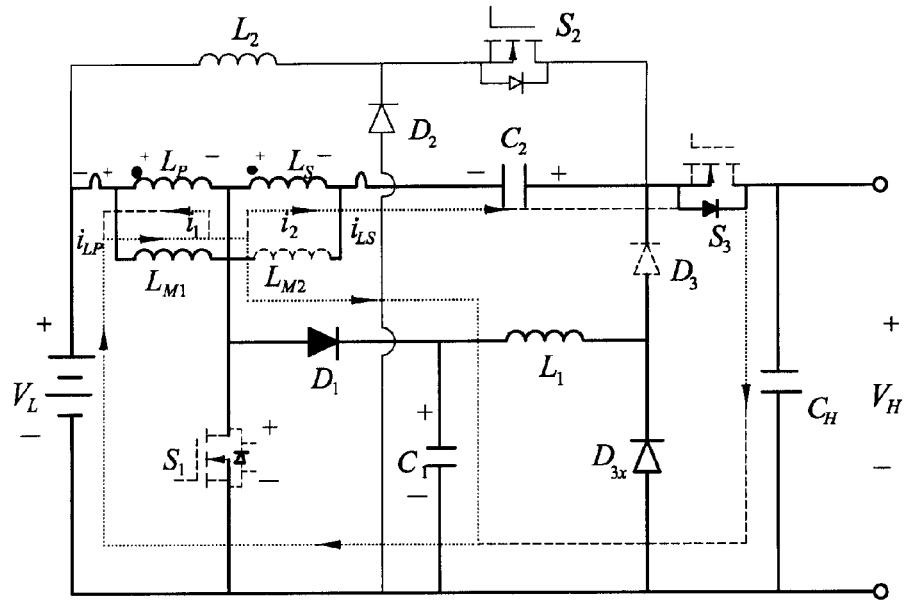
Mold3 (c)
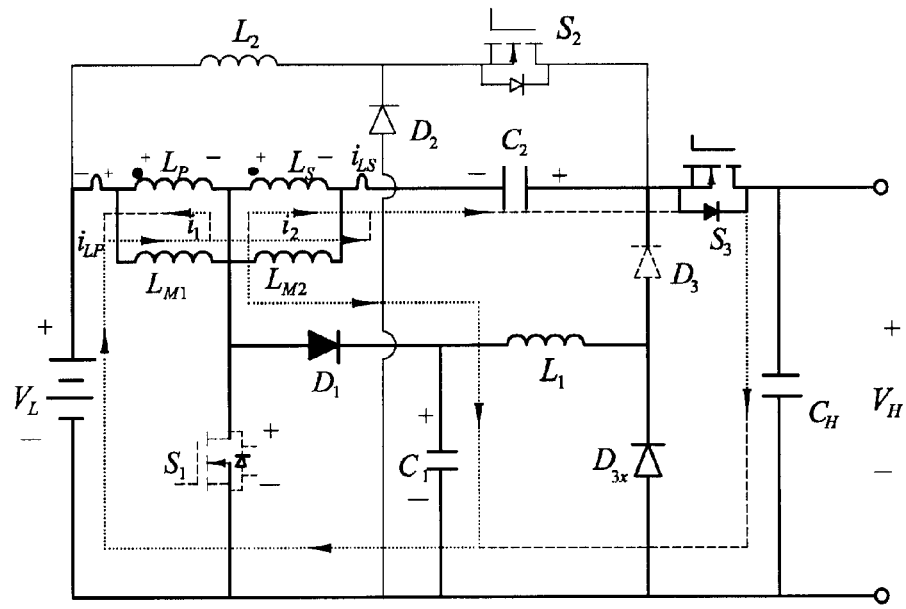
Mold4 (d)
*FIG.6(Continuation)*

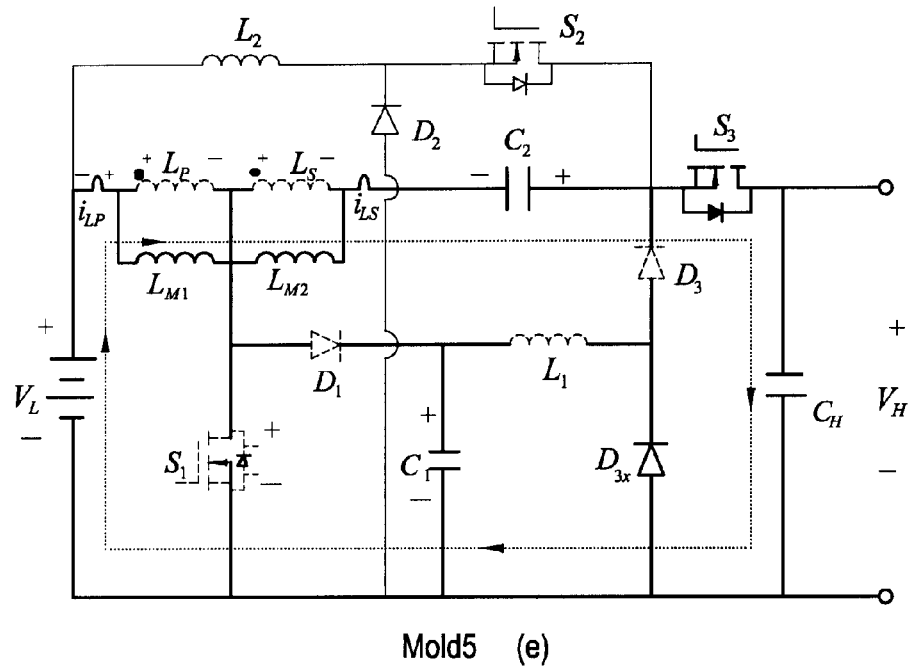
Mold5 (e)
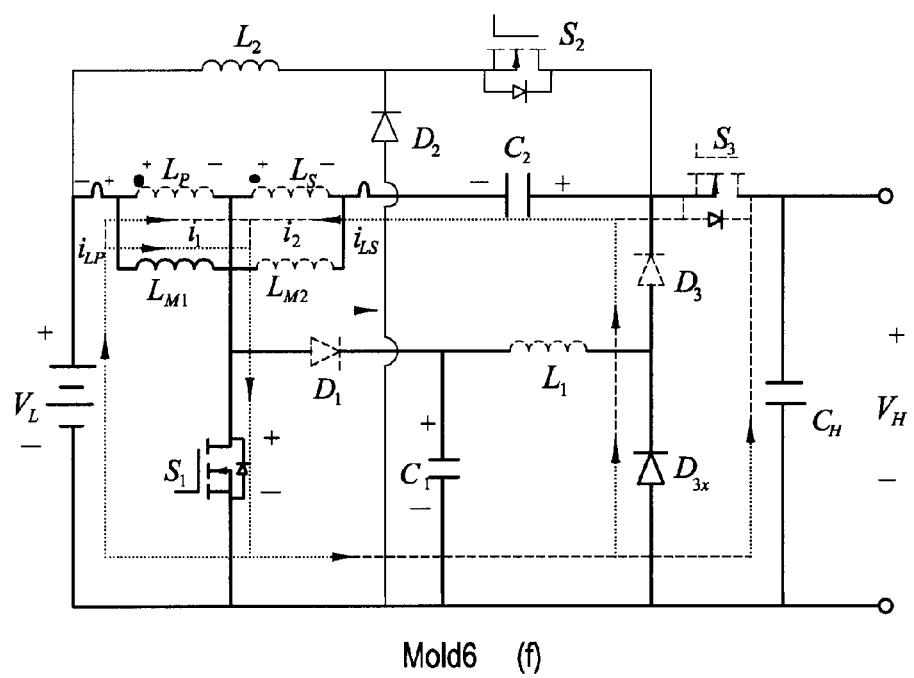
Mold6 (f)
*FIG.6(Continuation)*

(a)

(b)

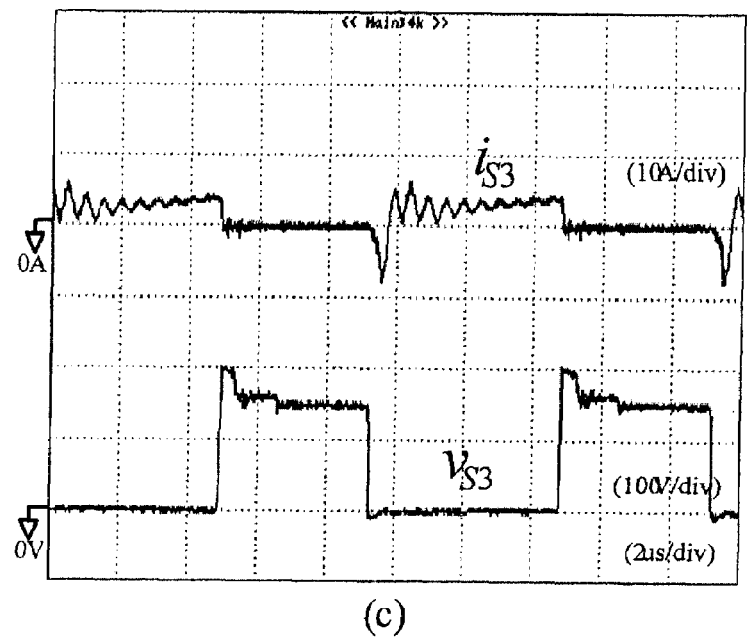
(c)
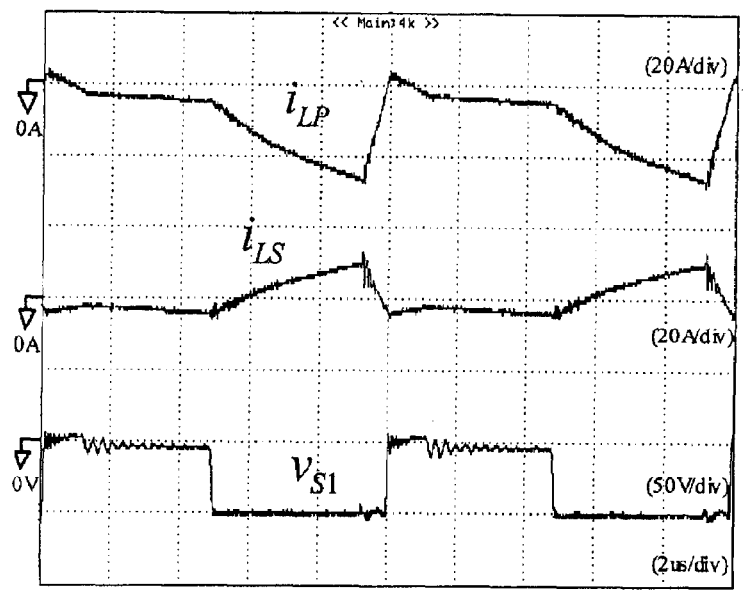
(d)
FIG.9(Continuation)

(a)

(b)

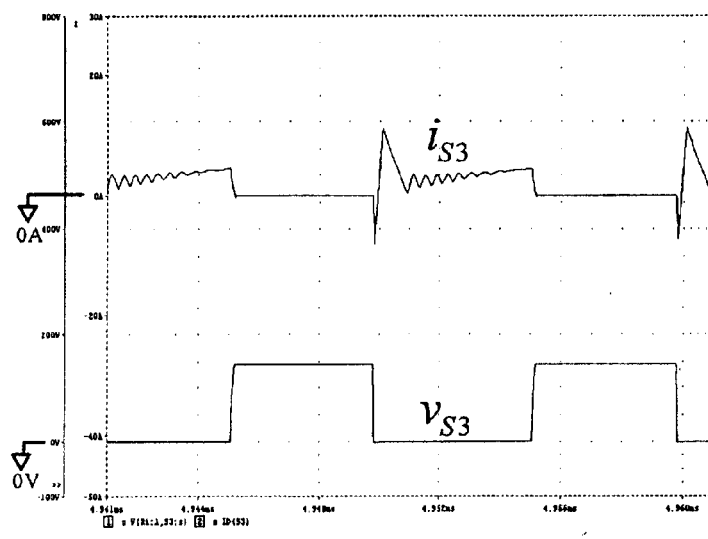
(c)
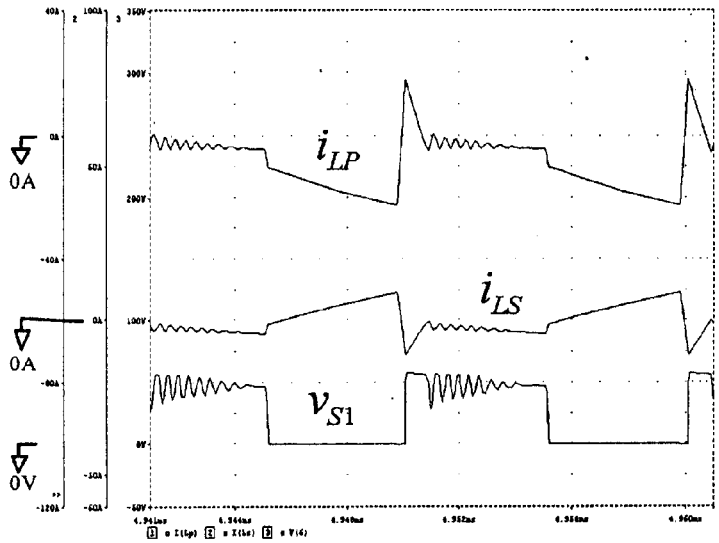
(d)
*FIG.13(Continuation)*

HIGH-EFFICIENCY HIGH-VOLTAGE DIFFERENCE RATIO BI-DIRECTIONAL CONVERTER

BACKGROUND OF THE INVENTION

1. Field of the Invention

The present invention is related to DC-DC conversion technology, specifically, the power system where rechargeable batteries are used as auxiliary power source, in which the voltage of the rechargeable batteries are boosted to high voltage system (or bus bar) to provide power for emergency or capacity adjustment, or in reverse charges the rechargeable batteries.

2. Description of the Prior Art

Clean energy source becomes an important subject due to oil shortage crisis. New hybrid car can increase mileage and reduce oil consumption. Due to frequent switching between battery power and engine power in order to maximize fuel efficiency, high efficiency bi-directional converter becomes a critical element. Traditionally, serially connected rechargeable batteries are used in order to reduce voltage gap between battery and appliance and to avoid technical problem in high boost ratio and low conversion rate in the step-up process. The main drawback of serially connected batteries is that each battery has different life span and if one goes bad, the whole supply will be cut off. In addition, all the batteries have to be replaced at once and the same brand has to be used so that the capacity of rechargeable batteries will match. While according to analysis of characteristic of power-voltage curve, there is no matching needed for parallel connected batteries and the number can be added or reduced at will so that it is easy to maintain and repair. Therefore, it is increasingly important to have high efficiency bi-directional converter for parallel connected batteries with low voltage.

Reference for traditional bi-directional converters are listed in [1]-[10] and their specifications, capacities, efficiencies, circuit topology and advantages/disadvantages are compared in Table 1.

TABLE 1

Technical Comparison

| Ref. | Low Vol. | High Vol. | Output Capa. | Conver. Ratio | Circuit Topology | Merits and drawbacks |
|---|---|---|---|---|---|---|
| [1] | 24 V | 48 V | 100 W | 94% | Half-bridge | Merit: High efficiency with light load. Drawback: Can't be used for heavy load |
| [2] | 12 V | 380 V | 1.6 kW | 92% | Half-bridge | Merit: Phase-shift control, soft-switching Drawback: switching frequency 20 kHz, high harmonics |
| [3] | 5 V | 9 V | 20 W | Step-up 85% Step-down 80% | Capacitor Charging | Merit: Simple, no inductor Drawback: low efficiency |
| [4] | 50 V | 360 V | 200 W | Step-up 91% Step-down 87% | Capacitor + Half-bridge | Merit: Synchronous rectification switching Drawback: low power and efficiency |
| [5] | 36 V | 70 V | 120 W | 91% | Capacitor + Bridge | Merit: Phase-shift control, soft-switching Drawback: Complex, needs 8 switches |
| [6] | 48 V | 72 V | 168 W | 89% | Capacitor + Bridge | Merit: Increases efficiency for low load Drawback: needs 8 switches, high loss |
| [7] | 24 V | 24 V | 60 W | Down-Stream 93% Up-Stream 94% | Flyback Transformer | Merit: High efficiency with light load. Drawback: no step-up and step-down |
| [8] | 36 V | 340 V | 800 W | Step-up 89% Step-down | Coupled Inductor | Merit: Simple Drawback: needs specific load |
| [9] | 10 V | 288 V | 1.6 kW | Step-up 94% Step-down 95% | Capacitor + Bridge | Merit: High Step-up ratio, High efficiency Drawback: Complex, needs 9 switches |
| [10] | 80 V 50 V | 100 V | 200 W | 91% | Capacitor + Bridge | Merit: Uses inductor as power source Drawback: need large capacity of transformer, and 8 switches |

From Table 1, most converters utilize transformer and 4-9 power semiconductor switches. Even though a few use zero-voltage or zero-current soft-switching, switching loss and conduction loss are still increased dramatically due to the current passing through too many switches. Also, transformers are not well suited to wide range of voltage changes due to saturation of the magnetic core caused by fluctuating excited induction current and the transformer has to bear all the output power.

Reference:

[1] D. H. Xu, C. H. Zhao, and H. F. Fan, "A PWM plus phase-shift control bidirectional DC-DC converter," *IEEE Trans. Power Electron.*, vol. 19, pp. 666-675, 2004.

[2] F. Z. Peng, H. Li, G. J. Su, and J. S. Lawler, "A new ZVS bidirectional DC-DC converter for fuel cell and battery application," *IEEE Trans. Power Electron.*, vol. 19, pp. 54-65, 2004.

[3] H. S. H. Chung, W. C. Chow, S. Y. R. Hui, and S. T. S. Lee, "Development of a switched-capacitor DC-DC converter with bidirectional power flow," *IEEE Trans. Circuits Syst.*, vol. 47, pp. 1383-1389, 2000.

[4] M. Jain, M. Daniele, and P. K. Jain, "A bidirectional DC-DC converter topology for low power application," *IEEE Trans. Power Electron.*, vol. 15, pp. 595-606, 2000.

[5] H. L. Chan, K. W. E. Cheng, and D. Sutanto, "Bidirectional phase-shifted DC-DC converter," *Electron. Letters.*, vol. 35, pp. 523-524, 1999.

[6] H. L. Chan, K. W. E. Cheng, and D. Sutanto, "ZCS-ZVS bi-directional phase-shifted DC-DC converter with extended load range," *IEE Proc. Electr. Power Appl.*, vol. 150, pp. 269-277, 2003.

[7] G. Chen, Y. S. Lee, S. Y. R. Hui, D. H. Xu, and Y. S. Wang, "Actively clamped bidirectional flyback converter," *IEEE Trans. Ind. Electron.*, vol. 47, pp. 770-779, 2000.

[8] C. Y. Inaba, Y. Konishi, and M. Nakaoka, "High frequency PWM controlled step-up chopper type DC-DC power converters with reduced peak switch voltage stress," *IEE Proc. Electr. Power Appl.*, vol. 151, pp. 47-52, 2004.

[9] K. Wang, C. Y. Lin, L. Zhu, D. Qu, F. C. Lee, and J. S. Lai, "Bi-directional DC to DC converters for fuel cell systems," in Proc. *IEEE Workshop Power Electron. Transport*, 1998, pp. 47-51.

[10] Y. M. Chen, Y C. Liu, and F. Y. Wu, "Multi-input DC/DC converter based on the multiwinding transformer for renewable energy applications," *IEEE Trans. Ind. Appl.*, vol. 38, pp. 1096-1104, 2002.

[11] Q. Zhao and F. C. Lee, "High-efficiency, high step-up DC-DC converters," *IEEE Trans. Power Electron.*, vol. 18, no. 1, pp. 65-73, 2003.

The present invention uses coupled inductor bidirectional topology and only 3 switches to control bidirectional currents. Due to the characteristics of high step-up and step-down ratio, low-voltage rechargeable battery can be injected into a high-voltage dc bus to benefit down stream high-voltage load or front-end of an inverter. Since the techniques of voltage clamping, synchronous rectification, zero-voltage and zero-current techniques are used in the present convert, and the corresponding device specifications are adequately chosen, it can achieve the goal of high-efficiency bi-directional power conversion for power sources with high voltage gain.

SUMMARY OF THE INVENTION

Referring to FIG. 1, the present invention includes a low voltage circuit 101 comprising a switch $S_1$, first winding $L_p$ of a coupled inductor $T_r$ where $S_1$ controls storing or releasing of energy in the first winding $L_p$ of inductor $T_r$; a median voltage circuit comprising second winding $L_s$ of the coupled inductor $T_r$, a median voltage capacitor $C_2$ which resides between the low voltage circuit 101 and a high voltage circuit 104 and mainly uses the capacitor $C_2$ to boost step-up ration or bear part of voltage during step-down; a clamping circuit 103 comprising a clamping inductor $L_1$, a clamping capacitor $C_1$, a first clamping diode $D_1$, a second clamping diode $D_3$ and a third clamping diode $D_{3x}$ which is mainly for absorbing leakage energy of coupled inductor, protecting the low voltage switch $S_1$ and releasing the absorbed energy to output terminal; the high voltage circuit 104 comprising a high voltage switch $S_3$ which provides a passage for bi-directionally transferring energy between the low voltage circuit 101 and the high voltage circuit 104, i.e., so-called high voltage bus bar; a step-down circuit 105 comprising a step-down switch $S_2$, a step-down inductor $L_2$ and a step-down diode $D_2$, which is responsible for releasing the discharge of the median voltage capacitor $C_2$ through a discharging loop.

The voltage between the low voltage circuit 101 and the high voltage circuit 104 is large and a bi-directional converter has to be able to switch between source and load. That is, if source is at the high voltage circuit 104 side, the load is at the low voltage circuit 101 side, which can be a DC equipment or a rechargeable battery in charging state. Otherwise, the source is at the low voltage circuit 101 side and power energy is boosted to the high voltage circuit 104 which supplies to a load on the high voltage bus bar; the low voltage power source can be rechargeable batter, fuel cell batter, wind powered generator or solar energy, i.e. clean energy DC generator. In summary, the present invention has to function in both step-up and step-down processes. During step-up, the low voltage switch $S_1$ conducts, the low voltage circuit 101 is the source, the first winding $L_p$ of coupled inductor $T_r$ is in charging state, at the same time charges the median voltage capacitor $C_2$ through the second winding $L_s$ of coupled inductor $T_r$ and the clamping capacitor $C_1$; when the low voltage switch shuts off, the leakage induction energy of coupled inductor $T_r$ is absorbed by the clamping capacitor $C_1$; after the impact of leakage induction is reduced substantially, the two windings of coupled inductor $T_r$, combined with the low voltage source $V_1$ and the median voltage capacitor $C_2$, then through the high voltage switch $S_3$, provide power to the high voltage circuit 104. During step-down, when the high voltage switch $S_3$ conducts, the high voltage circuit 104 is the source and it charges the median circuit 102 and the low voltage circuit 101; when the high voltage switch $S_3$ shuts off, all the energy in coupled inductor $T_r$ are transferred to the load on the low voltage circuit 101 through the first winding $L_p$ and synchronous rectification return loop; at the same time, the median voltage capacitor $C_2$ supplies power to the load of the low voltage circuit 101 through the low voltage switch $S_1$, step-down switch $S_2$, the second winding of coupled inductor $T_r$, and the step-down inductor $L_2$.

The present invention has DC step-up and DC step-down functions. Therefore, there are two processes and working modes for the circuit. The following is a detailed description for the two modes A, B of working processes. To simplify the analysis, ignore all the voltage drops of switches and diodes during their conducting states.

A. Step-down Process

Referring to FIG. 2 and FIG. 3, the equivalent circuit for the converter of FIG. 1 is shown in FIG. 2(a). Since the circuit has step-up and step-down working processes, the directions of induction current are clearly marked and define positive and negative of the current for all the subsequent figures. Also, for easier understanding, the parallel capacitor on the high voltage end simulates power source and load, and the rechargeable battery on the low voltage end will do the same. However, the present invention is not limited just to this kind of power sources and loads.

Mode 1: Time [t0-t1], the High Voltage Switch S3 Conducts for a Period of Time

At time t=t0, switch S3 conducts and allows current goes from the high voltage circuit through the capacitor C2 of the median voltage circuit and the second winding Ls of coupled inductor Tr, then the first winding Lp of coupled inductor Tr to the low voltage circuit. At this moment, the first Lp and the second winding Ls of coupled inductor Tr are equivalent to two inductors connected in series and on the same magnetic core. Let the winding ratio between Lp and Ls be N=N2/N1, excited inductions be LM and leakage induction be LK, then coupling coefficient k will be $$k = L_M/(L_k + L_M) \qquad (1)$$

Since the coupled inductor is made by windings in a sandwich fashion, it has a good coupling effect. Moreover, the leakage induction is relative small comparing to the capacity of the magnetic core; if a good voltage clamping is implemented, the leaked energy can be adequately absorbed and it will have minimum impact on overall system's voltage. Therefore, to simplify the theoretic analysis, let the coupling coefficient k=1. If LM1 and LM2 are the inductions for the first and second winding of coupled inductor Tr, and since the excited induction equals to square of number of winding, the relation will be LM1:LM2=N12:N22; therefore for Mode 1, induction LM of the coupled inductor equals to two serially connected inductors added up:

$$L_M = (1+N)^2 L_{M1} = (1+1/N)^2 L_{M2} \qquad (2)$$

the average excited current $i_{LMv}$ and its rate of increase will be $$i_{LMv} = P_{IN}/V_H \qquad (3)$$

$$L_M di_{LM}/dt = V_H - v_{C2} - V_L \qquad (4)$$

if the coefficient k=1, then LM1=Lp and LM2=Ls. PIN is the power provide by the voltage VH of the high voltage circuit; vC2 is the voltage on C2 and can be seen as fixed since the capacitor is very large. When the power provided by the high voltage circuit is fixed, the average current passed through switch S3 is iLMv, and its multiplication with the voltage VH equals to PIN. Consider the ratio of high voltage differences and ignore the loss, the ratio between average excited current iLMv and the average current iLv on the low voltage side equals to (VL/VH), therefore iLMv is much smaller than iLv. In addition, according to equation (2) induction value is proportional to square of number of windings, the coupling induction LM of the two windings serially connected is higher than any one of them. After deducting vC2 and VL, the voltage across excited induction LM becomes minimum, and plus, the excited induction LM amplifies the excited induction of independent winding of the coupled inductor which suppresses diLM/dt, this means that effective harmonics passed through the switch S3 can be effectively lowered. Thus low average current and low harmonics current produces relative a little conduction losses. For example, the conduction loss of MOSFET is i2RDS(on). Let vLP and vLS be the voltages across the first and second winding Lp and Ls of the couple inductor respectively, the relation between the two is $$v_{LS}/v_{LP} = N \qquad (5)$$

Therefore, the voltage $V_H$ can be represented as $$V_H = v_{C2} + v_{LS} + v_{LP} + V_L = (N+1)v_{LP} + v_{C2} + V_L \qquad (6)$$

In this mode, the first and second winding Lp and Ls of couple inductor $T_r$ excite induction simultaneously, currents in the two winding are equal (i.e. equals to $L_M$), in the same direction and rising, and supply to the low voltage circuit output end. Also, through the return loop of inductor $L_2$ and the diode $D_2$, the current $i_{L2}$ of step-down circuit discharges to the rechargeable battery at the low voltage end, and the induction's voltage $V_{L2}=V_L$, and charging current of the rechargeable battery is $i_{LP}+i_{L2}$. Moreover, observe the low voltage switch $S_1$ is in cut-off state and the voltage across it is $$v_{DS1} = V_L + v_{LP} \qquad (7)$$

Mode 2: Time [t1-t2], the Moment Switch S3 Trigger Signal Cuts Off

The moment switch S3 triggers signal cuts off (t=t1), although the two winding Lp and Ls of coupled inductor Tr lose the power provided by the switch S3, their currents can not change instantly due to their leakage induction Lk1 and Lk2 still have energy to release such that the current iLS of second winding Ls, through the diode D2 and the switch S2, continues but decreases gradually. At the moment, the voltage across it is zero, waiting for next mode zero voltage switching (ZVS). According to the flux conservation law and because the passage (high voltage switch S3 ) of current releasing through second winding is cut off, the energy inside iron core has only the first winding return route, its current iL2 releases to the rechargeable battery at the low voltage side through freewheeling diode passage of switch S1 and gradually increases. At the moment, the voltage across the switch S1 is zero and waiting for next mode, synchronous rectification conduction.

Mode 3: Time [t2-t3], the Moment Low Voltage Switch S1 and Step-down Switch S2 Trigger Signals Conduct In preceding mode, the freewheeling diode passage formed through the switch S1 and S2 already conducts, while in present mode it begins triggering direct conducting, current characteristics of the components maintain previous state and continue changing. The former is synchronous rectification, and for low voltage circuit with high input current, the synchronous rectification technique can drastically reduce conduction loss in freewheeling diode; and for the later, the switch is zero voltage conducting and has no switching loss. The present mode stops when the current iLS of second winding of coupled inductor Tr decreases to zero.

Mode 4: Time [t3-t4], the Median Voltage Capacitor C2 Discharges to the Low Voltage Circuit.

The present mode starts when the current iLP of first winding of coupled inductor Tr completely releases to the low voltage circuit, and the current of iLS rises to positive from zero, which means the median voltage capacitor C2 begins discharge, through switch S2, inductor L2, to the rechargeable battery at the low voltage circuit; then through freewheeling diode of switch S1 reaches to the polar terminal of second winding Ls. At the moment, inductor L2 is in storing state and it voltage vL2 is $$v_{L2} = v_{C2} - V_L - v_{LS} \qquad (8)$$

Also, the current iLS of second winding Ls, including excited induction current iLM1 and induction current i1 from the high voltage side, charge the rechargeable battery of the low voltage circuit through switch S1, and its voltage is vLS=NVL; if the first winding current ignores the lockout time of switch crossing, let duty cycle of switch S3 be d3, duty cycle of switch S1 and S2 be d1, then $$d_1 + d_3 = 1 \qquad (9)$$

the voltage vL2 of inductor L2 is between VL, vLS and vC2, its purpose is to bear the difference in the loop series connected these three voltages plus a power source. Since in mode 1 the voltage vL2 of inductor L2 equals to the rechargeable battery voltage VL, according to volt-second balance, in mode 4 voltage vL2 is $$v_{L2} = V_L d_3/d_1 \qquad (10)$$

Substitute equation (10) and the second winding voltage vLS=NVL into equation (8), then $$v_{C2} = (N+1+d_3/d1)V_L \qquad (11)$$

Substitute equation (9), (11) and (12) into equation (6), let step down ratio be GV1, then $$G_{V1} = \frac{V_L}{V_H} = \frac{d_3(1-d_3)}{N(1-d_3)+1} \qquad (13)$$

Using equation (13), the curves between step-down ratio GV1 versus duty cycle d3 of the switch S3 can be drawn as in FIG. 4 for different winding ration N. From the duty cycle d3, when VH is fixed, highest step-down ratio occurs at duty cycle ≠GV1/≠d3 and can be expressed as follows $$d_{3(max)} = \left(1 + \frac{1}{N}\right) - \sqrt{\frac{1}{N}\left(1 + \frac{1}{N}\right)} \qquad (14)$$

This point represents highest duty cycle of switch S3. From FIG. 4, in region less than d3(max), the larger the duty cycle, the higher the output of the low voltage circuit; once over d3(max), the output of the low voltage circuit starts lowering; therefore, in the region beyond d3(max), the output of the low voltage circuit can not be adjusted and controlled.

Substitute equation (12) into equation (7), we get the voltage vDS1 across the switch S1 and the voltage vC1 of claming capacitor C1

$$v_{DS1} = v_{C1} = V_L/d_3 \qquad (15)$$

Based on analysis of equation (15), VL/d3 is the tangent of curve GV1 of step-down ratio in FIG. 4(a). When the current iS2 of switch S2 is getting bigger than step-down induction current iL2, diode D2 cuts off and second clamping diode D3 conducts which release current iC1 of clamping capacitor C1, at the moment, the voltage VH across high voltage switch S3 decreases to VH−vL2+VL.

Mode 5: Time [t4-t5], Low Voltage Switch S1 and Step-down Switch S2 Trigger Signal Cut Off at the Same Time At the moment, the current previously passing switch S2 charges its parasite capacitor, since vDS3+vDS2+vD=VH, voltage vDS2 rises, the other two voltages must decrease. First, inductor L2 conducts for current iL2, diode D2 must conduct. From equation (12), the voltage across diode D2 at mode 1 is $$v_{D2} = V_L/(1-d_3) \qquad (16)$$

Based on equation (14) already limiting maximum duty cycle d3, by putting the maximum value in equation (16) can obtain specification of break down voltage of diode D2. According to FIG. 4, since d3(max) mostly resides between 0.6~0.7, the maximum voltage the diode D2 has to bear is about 3 times of the voltage of the rechargeable battery; therefore Schottky diode of low conducting voltage, low conducting loss, can be used. Second, leakage induction Lk2 of second winding and clamping induction LI have to maintain continuous current, its conducting passage must force the freewheeling diode of switch S3 to conduct and since the diode is a fast conducting Schottky diode, at the moment compensating the voltage across switch S3, one increases one decreases; when switch S2 cuts off, the freewheeling diode of switch S3 finishes conducting; and at the same time the voltage released by clamping induction L1 is L1diL1/dt=VH−vC1, therefore its current iL1 rapidly decreases. Since leakage induction still has leftover energy keeping release, induction current of i1 and i2 of two windings of coupled inductor Tr can't stop immediately, but rapidly decrease.

Mode 6: Time [t5-t6], High Voltage Switch S3 Triggers Signal Conducts

When the freewheeling diode of switch S3 conducts, the voltage across the switch is zero; at this time, triggering signal conducts, its waveform has effect of zero voltage switching. Since the currents in each component reach ending section in preceding mode, plus switch S3 gives coupled inductor Tr excited induction passage, second winding Ls will receive excited induction again and first winding current iLP will decrease gradually. Due to the effect of excited induction of second winding Ls, non-polar terminal of first winding has positive voltage, the freewheeling diode of switch S1 cuts off, and the current iLP of first winding starts charging the parasite capacitor of switch S1. Because the parasite capacitor of switch S1 is bigger than that of a normal high voltage switch, when the voltage across is rising, it needs higher charging current, which includes iL2, iLM2 and i2. After clamping inductor L1 finishes releasing current, second clamping diode D3 cuts off, its reverse recovery current will flow reversely to the clamping inductor L1, the later causing the two's voltages oscillate; therefore by adding a third clamping diode D3x may effectively limits the voltage of second clamping diode D3. When voltage vDS1 of switch S1 equals to the voltage vC1 of clamping capacitor C1, the present mode is over.

Mode 7: Time [t6-t0], the First Camping Diode D1 Conducts

When the voltage of switch S1 is higher than the voltage vC1 of clamping capacitor C1, the first clamping diode D1 conducts, and let the current previously charged to parasite capacitor to the clamping capacitor C1; since its capacity is designed very large, there is almost no harmonics in the voltage vC1, and the voltage across switch S1 has been limited, and transfer energy through the passage provided by mode 4 to the low voltage circuit, its voltage is shown in equation (15); the voltage VL is proportionally related to the duty cycle d3, therefore, MOSFET switch of low conducting voltage, low conduction loss may be used. When leakage induction completely released, the first clamping diode D1 cuts off, meaning induction currents i1 and i2 are reduced to zero; first and second winding Lp and Ls of coupled inductor Tr receive the same excited induction current in series, and finish a switching cycle; then the working mode returns to mode 1.

B. Step-up Process

The process of the present invention for the step-up is shown in FIGS. 5 and 6. For bi-directional converter, during step-up process, step-down components of the circuit do not need work, such as step-down inductor $L_2$, diode $D_2$ and switch $S_2$, they are circled by a dotted line in FIG. 6. The following analysis will be based on these two figures.

Mode 1: Time [$t_0$-$t_1$], Low Voltage Switch $S_1$ Conducts for a Period of Time At time t=$t_0$, the switch $S_1$ has already conducted for a period of time, first winding Lp of coupled inductor Tr draws current excited induction from the rechargeable battery of low voltage circuit, and the current $i_{LP}$ of first winding Lp consists of first winding induction current $i_1$ and excited current $i_{LM1}$. The first winding induction current $i_1$ comes from second winding induction current $i_2$ of idealized transformer; while the excited current $i_{LM1}$ is produced by excited induction $L_{M1}$, mainly storing energy when switch $S_1$ conducts, then transfer to the second winding after switch $S_1$ cuts off. At the moment, three currents $i_1$, $i_{LM1}$ and $i_2$ all reach the switch $S_1$, and the polar terminal of the second winding has positive voltage, the voltage $v_{C1}$ of series connected clamping capacitor $C_1$ charges the median voltage capacitor $C_2$ through the passage formed by inductor $L_1$, switch $S_1$ and diode $D_3$. As explained previously in the step-down part, letting the coupling coefficient k to be 1, and since inductor $L_1$ is designed to be small, its current $i_{L1}$ equals to second winding current $i_{LS}$, and both are small; further effected by second winding leakage induction $L_{k2}$, limiting change rate of the current, second winding voltage $v_{L2}$ can be omitted. Therefore the voltage $v_{C1}$ of median voltage capacitor is $$v_{C2}=NV_L+v_{C1} \quad (17)$$

During this period, the current $i_{DS1}$, equals to $i_1+i_{LM1}+i_2$; and since excited induction current $i_{LM1}$ is inductor stored energy, current gradually increases and slope of the waveform is positive; at the moment the switch conducts, charging current $i_2$ of median capacitor $C_2$ is at the maximum in a duty cycle, and decreases gradually along its voltage rises; current $i_2$ is produced by first winding inductor current $i_1$, their relation is $i_1=Ni_2$, slope of the waveform is negative. Therefore, the current $i_{LP}$ of first winding Lp is sum of $i_1$ and $i_{LM1}$, while two's slopes compensate each other, causing the current $i_{LP}$ to be nearly square waveform during switch conducting; for the same reason, first winding current $i_{LP}$ plus second winding inductor current $i_2$ (high voltage small current) equal to the current $i_{DS1}$ of low voltage switch $S_1$, its waveform is close to square too. There are two meanings for the square waveform: first, there are very little harmonics in the current of low voltage switch $S_1$, and switch conduction loss is proportional to square of the current; assuming under the same average current, sum of square of square waveform is smaller than sum of square of triangle waveform; therefore, the conduction loss of low voltage switch $S_1$ for square waveform current is much less than a current with high harmonics. Second, current $i_1$ and $i_{LM1}$ have opposite slopes, and may accept lower excited induction $L_M$, meaning the number of first winding Lp of coupled inductor Tr and capacity of its iron core can be reduced dramatically, and core loss and wire loss caused by large current of first winding are reduced too.

Mode 2: Time [$t_1$-$t_2$], Low Voltage Switch $S_1$ Trigger Signal Cuts Off

The low voltage switch $S_1$ trigger signal cuts off at time $t=t_1$, effected by leakage energy released by the first and second winding of coupled inductor Tr, the currents $i_{LP}$ and $i_{LS}$ of the first and second winding of coupled inductor Tr continue flow and charge parasite capacitor of low voltage switch $S_1$; therefore, the voltage $V_{DS1}$ across the switch rises quickly, and the voltage $V_{DS3}$ of high voltage switch $S_3$, which is in the process of cutting off, starts to decrease. When the voltage $V_{DS1}$ across low voltage switch $S_1$ equals to the voltage $v_{C1}$ of clamping capacitor $C_1$, the present mode is over.

Mode 3: Time [$t_2$-$t_3$], the Current $i_{LS}$ of Second Winding of Coupled Inductor Reverses Direction When the voltage $V_{DS1}$ across low voltage switch $S_1$ is higher than the $v_{C1}$ across clamping capacitor $C_1$, the first clamping diode $D_1$ conducts, charging clamping capacitor $C_1$, and absorbing the energy released by leakage induction $L_{k1}$ of first winding Lp; since this capacitor is large in capacity and has optimum high frequency response in order to guide the current $i_{DS1}$ to the clamping capacitor C1 quickly, its voltage $v_{C1}$, can be treated as a stable DC voltage with low harmonics, to guarantee the switch can bear maximum voltage. In addition, the first clamping diode $D_1$ has to be able to quickly conducts, having the same specification on voltage as low voltage switch $S_1$, which means Schottky diode of low conducting voltage, low conducting loss is the best choice.

From the characteristics of this mode of the circuit, if excited induction continues, clamping capacitor $C_1$ is the output voltage of traditional boost converter; therefore, relation between the voltage $v_{C1}$ of clamping capacitor and the voltage $V_L$ of low voltage circuit is $$v_{C1}=V_L+v_{LP}=v_{DS1}=V_L/(1-d_1) \quad (18)$$

since second winding Ls has only high voltage induction current i2, which is much smaller than first winding current iLP, the energy of second winding leakage induction Lk2 releases much quicker than that of first winding, while there is high current in leakage induction Lk1 of first winding it releases slowly; furthermore due to supply by the declining voltage of clamping capacitor C1 of mode 1, it continues for longer time. High capacity of clamping capacitor C1 can sufficiently absorb the energy of first winding leakage induction Lk1, and releases to median capacitor C2 when low voltage switch S1 conducts in mode 1, therefore clamping leakage induction energy and adding to boost voltage. At time t2, second winding current iLS decreases to zero, first excited induction current iLM1 releases energy, through magnetic passage to second winding; current iLS gradually rises and flow out of non-polar terminal. Second winding current iLS will force the voltage vDS3 of parasite capacitor of high voltage switch S3 to discharge to high voltage circuit, and gradually decreases to zero and turn on the freewheeling diode of high voltage switch S3.

Mode 4: Time [t3-t4], High Voltage Switch S3 Trigger Signal Conducts

When the freewheeling diode of high voltage switch S3 conducts, by applying trigger signal to finish synchronous rectification in order to reduce conduction loss. At the moment, rechargeable battery voltage VL, first winding voltage vLP, second winding voltage vLS and median voltage capacitor voltage vC2 are connected in series, and charge high voltage capacitor CH with a low current. After leakage energy exhausts, according to the flux conservation law, excited energy of coupled inductor Tr maintains current in first and second winding circuit for a period of time, where first winding charges clamping capacitor C1 and second winding releases current to the high voltage circuit. In the middle period of mode 4, voltage vC2 of median capacitor C2 decreases due to continued discharge, while voltage vC1 of clamping capacitor C1 rises due to long-time charging, and bias of first clamping diode D1 cuts off. At this time, first winding current iL1 equals to second winding current iL2, and the present mode is over.

Mode 5: Time [t4-t5], Equal Currents of Two Windings of Coupled Inductor Tr Charge High Voltage Circuit When current iL1 equals to iL2, energy in iron core equally releases to two windings; non-polar terminal of second winding Ls of coupled inductor Tr has a positive voltage, which is $$v_{LS}=Nv_{LP}=d_1NV_L/(1-d_1) \quad (19)$$

at the moment, VL, vLP, vC1 and vLS discharge to the high voltage circuit together; using equation (17) to (19), the voltage VH of high voltage circuit can be calculated as follows:

$$V_H = V_L + v_{LP} + v_{C2} + v_{LS} = \frac{2+N}{1-d_1}V_L \quad (20)$$

where $G_{v2}$ is $$G_{V2} = \frac{V_H}{V_L} = \frac{2+N}{1-d_1}, \quad (21)$$

according to equation (21), curves can be drawn for relation between boost ratio GV2 and duty cycle d1 of low voltage switch S1, with different winding ratio N, comparing to boost ratio of traditional coupled inductor circuit [11]. Substitute equation (18) to equation (20), then the voltage across low voltage switch S1 can be obtained $$v_{DS1}=V_H/(N+2) \quad (22)$$

from equation (22), fixing voltage VH of high voltage circuit and winding ratio N, the voltage beard on low voltage switch S1 is not related to the voltage VL of low voltage circuit and duty cycle d1; therefore, it guarantees the highest voltage beard by power semiconductor switch is fixed. As long as the input voltage is not higher than the limit of low voltage switch S1, of the converter designed according to equation (22), plus high voltage boost ratio, low voltage circuit can accept large range of high, low voltages. The trigger signal of high voltage switch S3 can cut off earlier, before low voltage switch S1 conducts, and finishes synchronous rectification mode.

Mode 6: Time [t6-t0], the Moment of Low Voltage Switch S1 Trigger Signal Conducts the low voltage switch S1 conducts at t=t0; since first clamping diode D1 is a low voltage Schottky diode, the low voltage switch S1 reverses at the instance of conducting. The leakage induction Lk1 limits rising slop of current iLP, and leakage induction current iLS of second winding needs time to decrease to zero, the two leakage induction currents restrain each other; also, the bias of first clamping diode D1 has no reversal recovery current, the switch can not get any current from passages of low voltage circuit, median voltage circuit and first clamping diode D1, automatically forming zero current switching (ZCS). At the moment, circuit current still maintains output direction but gradually decreases; the circuit has soft switching characteristics when conducting and effectively reduces switching loss.

At end of the mode, after leakage induction energy releases, the current iLS of second winding of coupled inductor Tr reverses direction and flows to low voltage switch S1, applying small reversal recovery current to freewheeling diode of high voltage switch S3. Since clamping inductor L2 can not supply current to second winding current iLS instantly, current iLS forces second clamping diode D3 and third clamping diode D3x to conduct, and the voltage vDS3 of high voltage switch S3, which is in cut-off state, equals to the voltage VH of high voltage circuit. When clamping induction current iL1 equals to second winding current iLS, the moment at which third clamping diode D3x cuts off, the voltage vDS3 across switch S3 returns to VH−vC1, completing a switching cycle; next working mode will be mode 1 again.

The present invention has two, i.e. step-up and step-down, operating processes; if only one process is utilized, part of components can be substituted or omitted, but still possess characteristic of the present invention. If only step-down process is utilized, the low voltage switch S1 is only functioning in synchronous rectification, and can be replaced by a Schottky diode of low conducting voltage, low conducting loss. If only step-up process is used, other than previously mentioned step-down circuit, since high voltage switch S3 is only functioning in synchronous rectification, it can be replaced by a general diode.

The present invention has following advantages:

1) Less switches and simple topology. The present invention uses only three switches to achieve bi-directional energy transferring function, where existing technique needs at least 4 or more switches.

2) Larger voltage difference and flexible choice of low power sources. The present invention can provide high voltage DC power supply to front end of AC load, and low voltage circuit uses 12v high capacity batteries parallel connected, such that avoiding the problem associated with series connected batteries.

The present invention has voltage clamping and soft switching, as well as high conversion efficiency. By taking advantage of small current at high voltage end and large current at low voltage end, and highest voltage of clamping, switch, the present invention maximizes components capacities, including switch utilization rate, low conduction loss and low cost. By utilizing leakage induction, the present invention achieves zero voltage switching and reduces high frequency switching loss.

All the switches and diodes can achieve clamping function. There is no problem related to short current when switch conducts and high reversal recovery current in diode. And no snubber is needed.

During step-up operation, the voltage beard by switch is not related to input voltage; the voltage beard by power semiconductor switch is related only to output voltage and winding ratio of coupled inductor; this property is well suited for a power conversion application with wide range of input voltage, and necessary condition is that DC input voltage can't be higher than the voltage power semiconductor switch can bear.

Although no electrical isolation, the present invention still capable of isolating electrically. According to circuit theoretic analysis, even during low voltage circuit is in open circuit state, there would be no high voltage situation occurs. If uncontrollable happens, i.e. components failure, high voltage situation occurs, due to the chosen low voltage switch S1 has low break-down voltage, it will cause the switch vDS break down and produce short-circuit current, reducing the voltage of relevant components of low voltage circuit which may be contacted by human; the short-circuit current will melt safety fuse quickly, isolating high voltage from passing to low voltage circuit and ensuring operator's safety.

These features and advantages of the present invention will be fully understood and appreciated from the following detailed description of the accompanying drawings.

DETAILED DESCRIPTION OF THE PREFERRED EMBODIMENT

Figure 4:
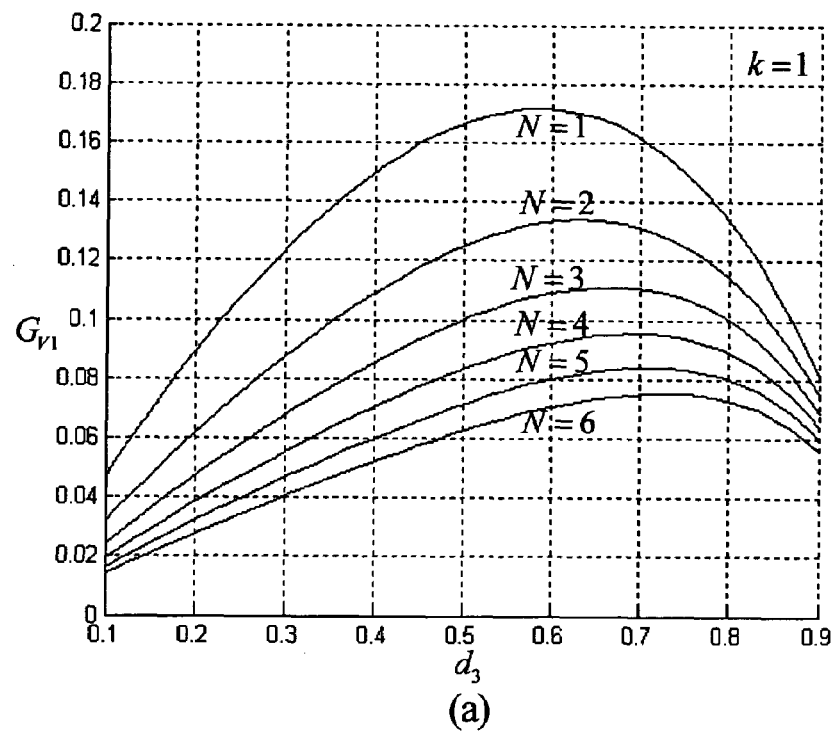
FIG. 4 is the relation curves between step down ratio $G_{V1}$ and high voltage switch $S_3$, duty cycle $d_3$, for different winding ratio N, of step down portion circuit of the present invention.
Figure 4:
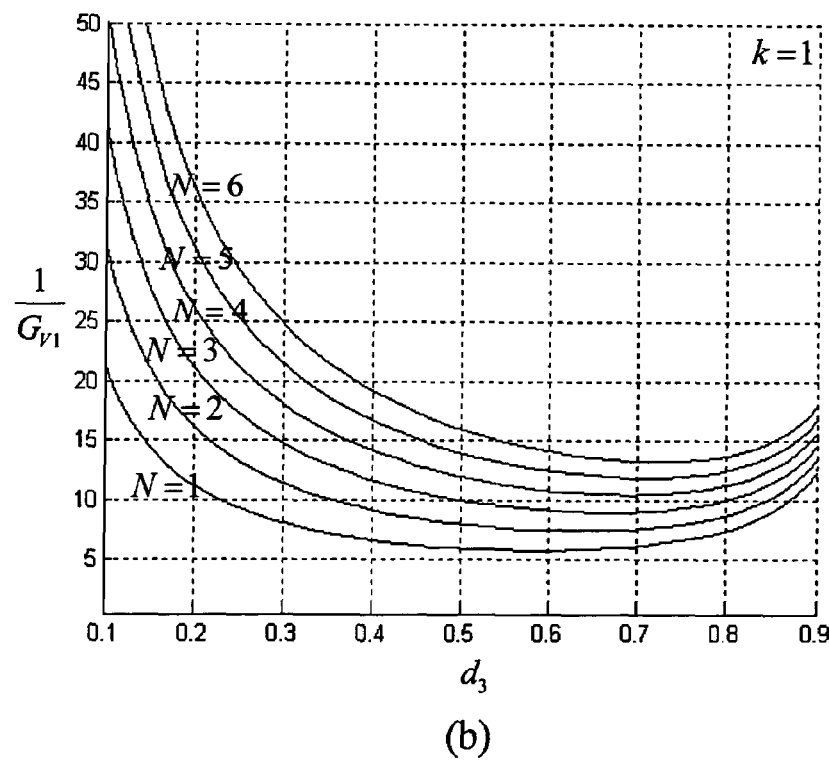
Figure 5:
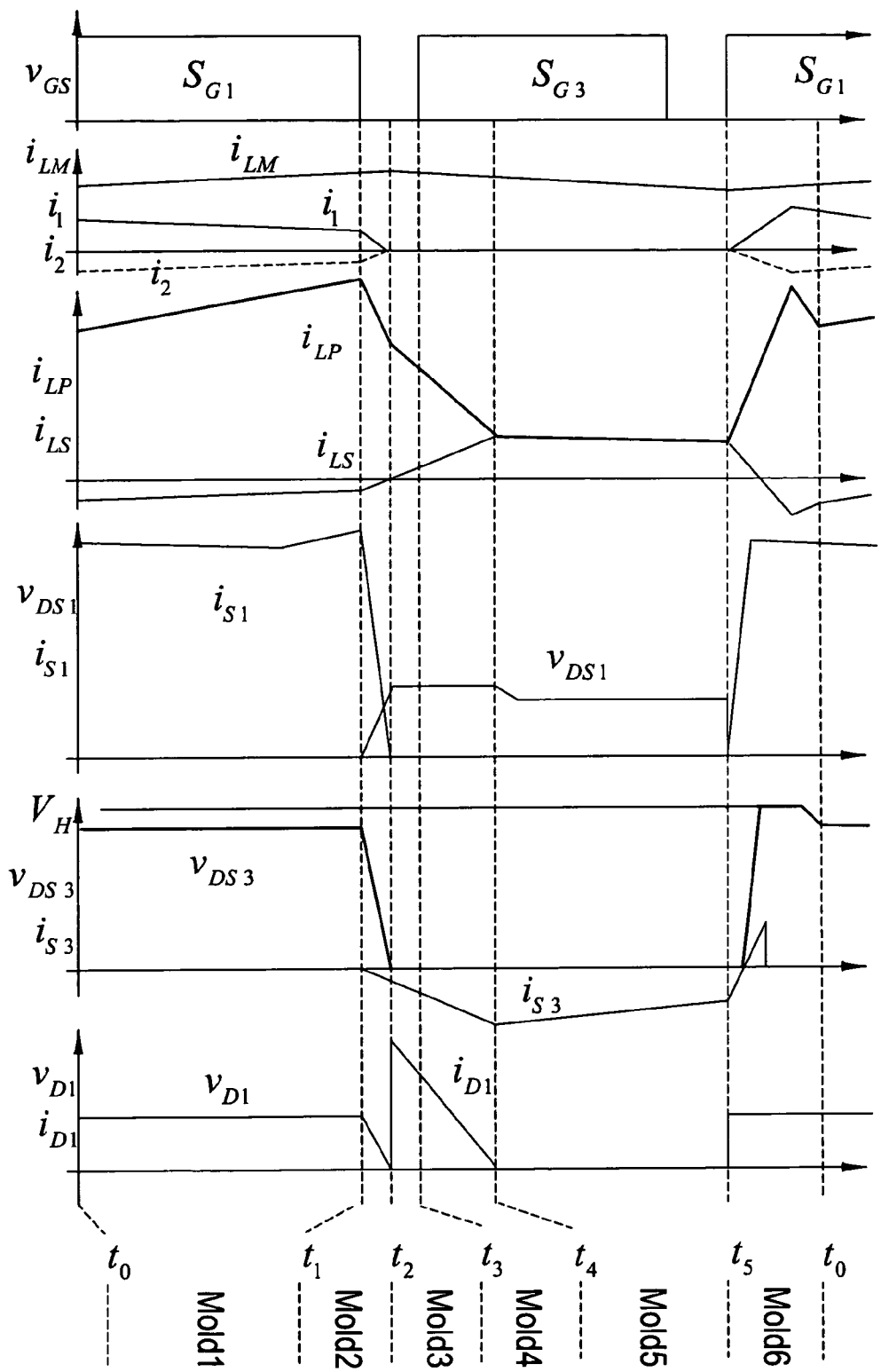
FIG. 5 is the time line of step-up portion circuit of the present invention.
Figure 6:
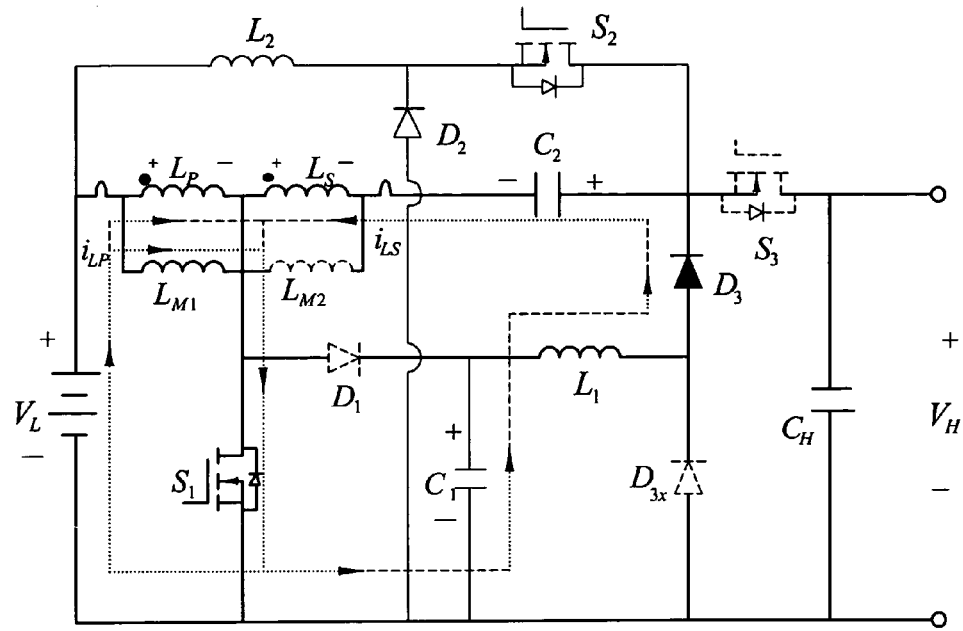
FIG. 6 is the working modes of step-up portion circuit of the present invention.
Figure 6:
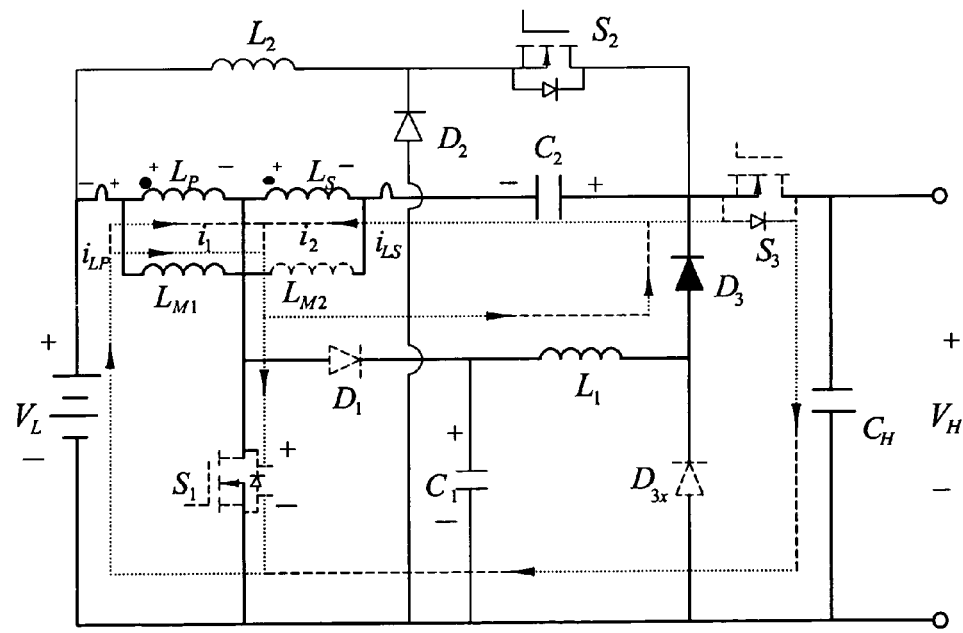
Figure 7:
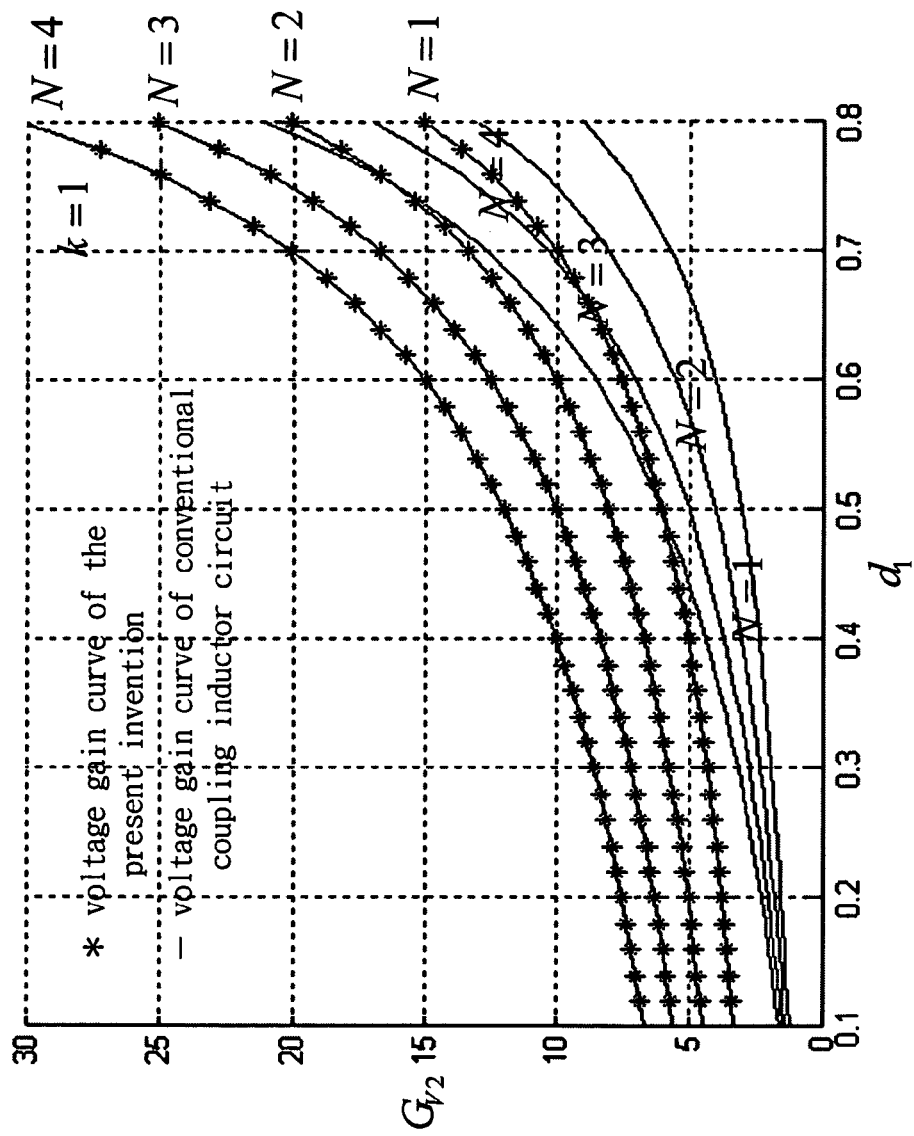
FIG. 7 is the relation curves between step up ratio $G_{V2}$ and high voltage switch $S_1$, duty cycle $d_1$, for different winding ratio N, of step down portion circuit of the present invention; and comparing to the boost ratio of a traditional coupled inductor circuit.
Figure 8:
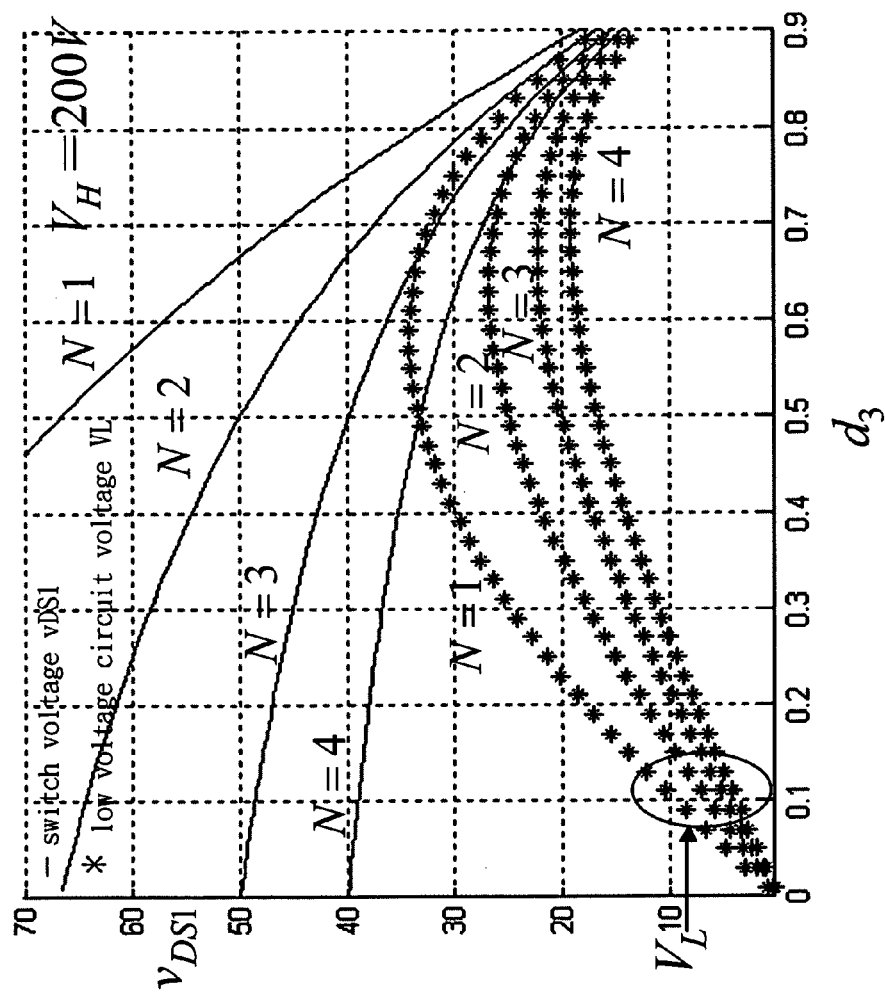
FIG. 8 is the relation curves between low voltage switch voltage $V_{DS1}$, low voltage circuit voltage $V_L$ and high voltage switch $S_3$, duty cycle $d_3$, for different winding ratio N, at high voltage circuit voltage $V_H$=200v, of step-down portion circuit of the present invention.

The specification of the present invention is based on high voltage circuit voltage $V_H$=200V and low voltage circuit voltage $V_L$=24V; it is based on consideration for application where a DC 200V power source is used for the front end of a 110V AC converter, and rechargeable batteries are used as auxiliary power source and loads, where two groups 12V DC batteries connected in series are commonly used. First step in design is to determine winding ratio of coupled inductor and switches specification. From voltage specification, $G_{V2}$=1/$G_{V1}$=8.33, therefore the duty cycle $d_3$ of high voltage switch $S_3$ must be designed according to equation (14); at the same time, it must meet the voltage adjustment requirement of step-up/down bidirectional voltage boost gain; and by cross comparing FIG. 4 and FIG. 7, it can be determined that the winding ratio N=2. As aforementioned, in both step-up and step-down operating process, clamping capacitor $C_1$ can absorb leakage induction energy of coupled inductor, its energy then can be provided to output terminal through other passage; therefore the size of leakage will have limited impact on the range of voltage boost gain, and the present invention only needs traditional method of two separated windings, not limited to use sandwich winding method of high coupling co-efficiency. The coupled inductor of the current embodiment is a transformer with large air gap with high excited induction current, double winding; using different winding ratios of the transformer to separate voltage and current range, the low voltage side has less winding but large current, opposite on the high voltage side. Substituting winding ratio into step-down circuit of FIG. 8, and designing the relation curves between low voltage switch voltage $V_{DS1}$, low voltage circuit voltage $V_L$ and duty cycle $d_3$ of high voltage switch $S_3$, for different winding ratio N, at high voltage circuit voltage $V_H$=200V. Based on the calculation according to this figure, when low voltage circuit voltage is zero, the low voltage switch $S_1$ bears up to 65V voltage; therefore a MOSFET with 80V tolerance can be used. As to the highest voltage on step-down switch $S_2$ and high voltage switch $S_3$ equals to high voltage circuit voltage 200V, therefore MOSFETs with 250V tolerance can used. For diodes, second clamping diode $D_3$ bears the same voltage as high voltage circuit voltage 200V, a fast speed diode with 250V tolerance can used; for rest of diodes, since voltage clamping is less than or equal to the voltage $v_{C1}$ of clamping capacitor $C_1$, Schottky diodes of low conduction voltage, low reversal recovery current can be used. The current embodiment has a switching frequency 100 kHz, and detailed specification is as follows:

$V_H$: 200V $V_L$: 24V $T_r$: $N_1$: $N_2$=3T: 6T; $L_p$=14 µH; $L_s$=52 µH; k=0.98; core: EE-55

$S_1$: FQI90N08, 80V/71A $R_{DS\ (ON)}$=12 mΩ, I²PAK $S_2$ and $S_3$: IRFP264N, 250V/44A, $R_{DS(ON)}$=60 mΩ, TO-247

Figure 1:
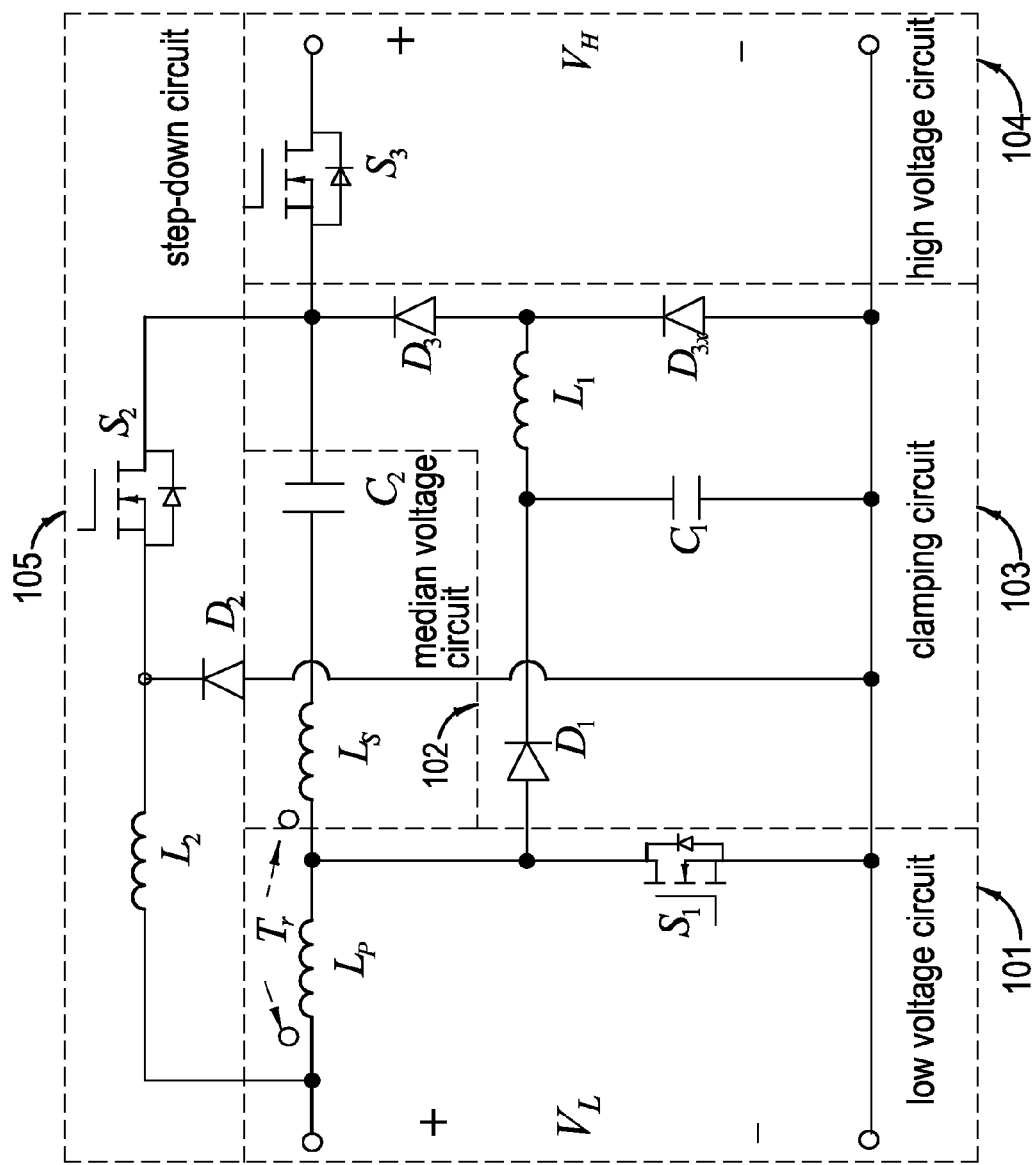
FIG. 1 is the first preferred embodiment of the present invention.
Figure 2:
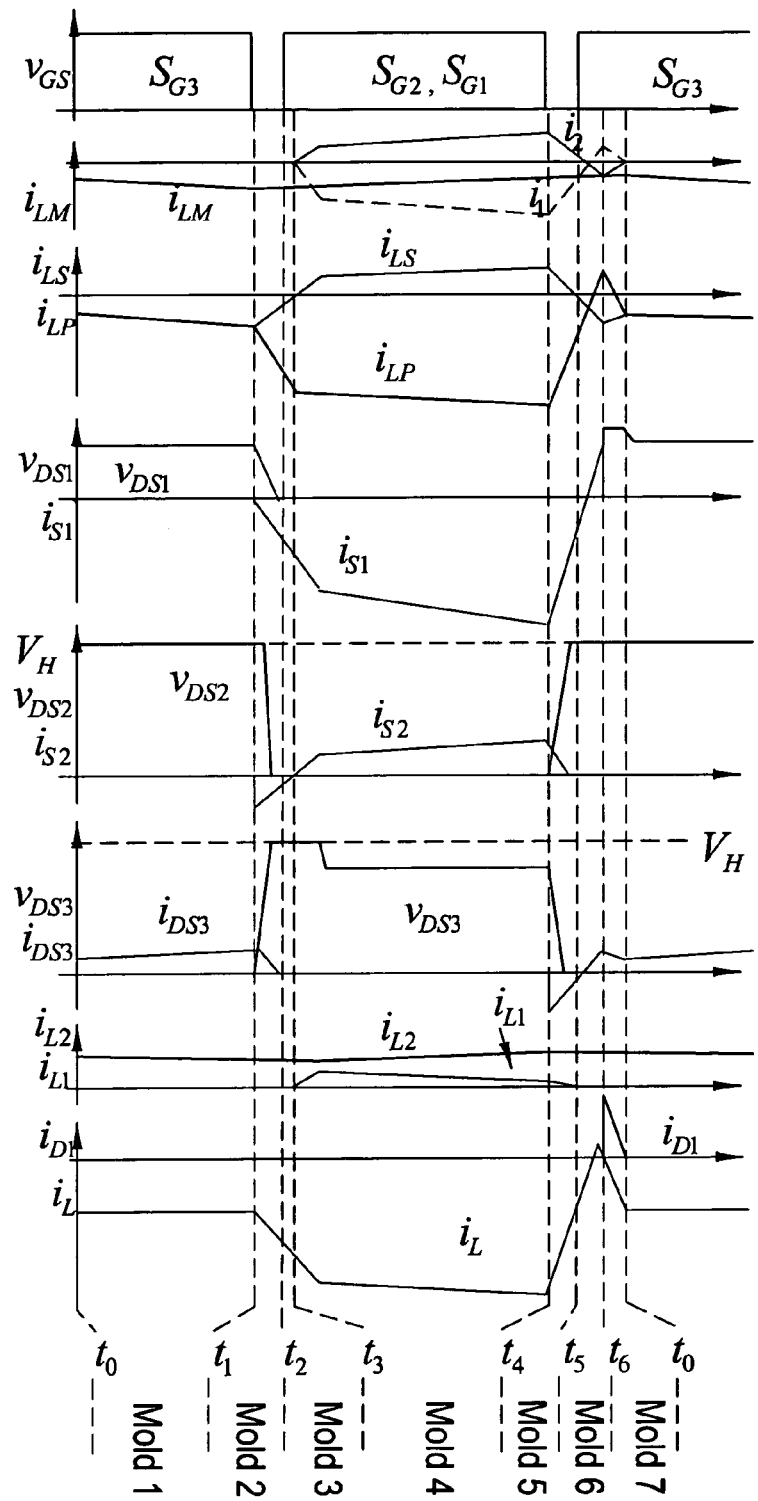
FIG. 2 is the time line of step down portion circuit of the present invention.
Figure 3:
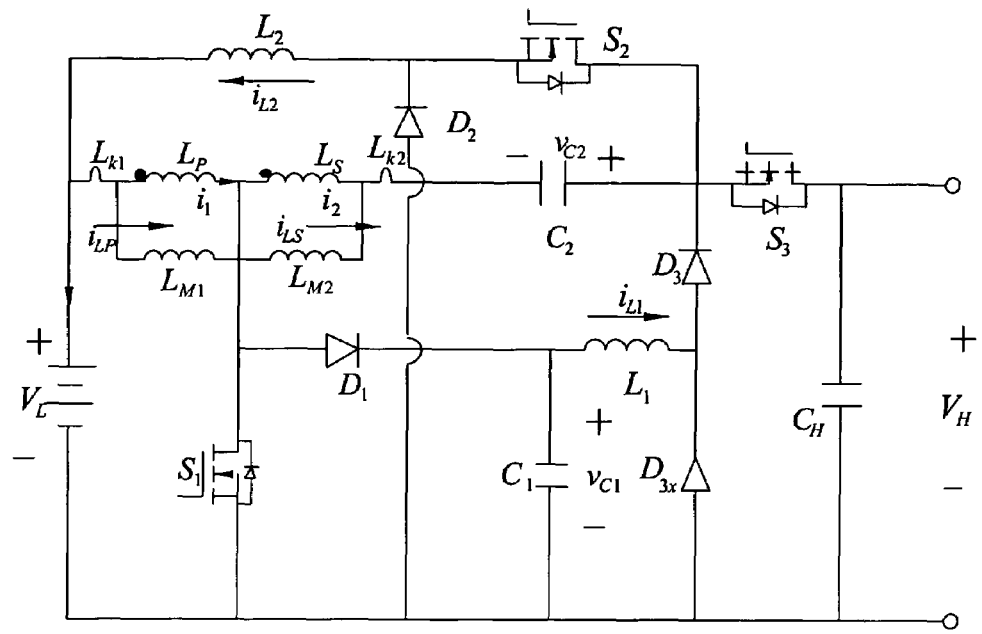
FIG. 3 is the working modes of step-down portion circuit of the present invention.
Figure 3:
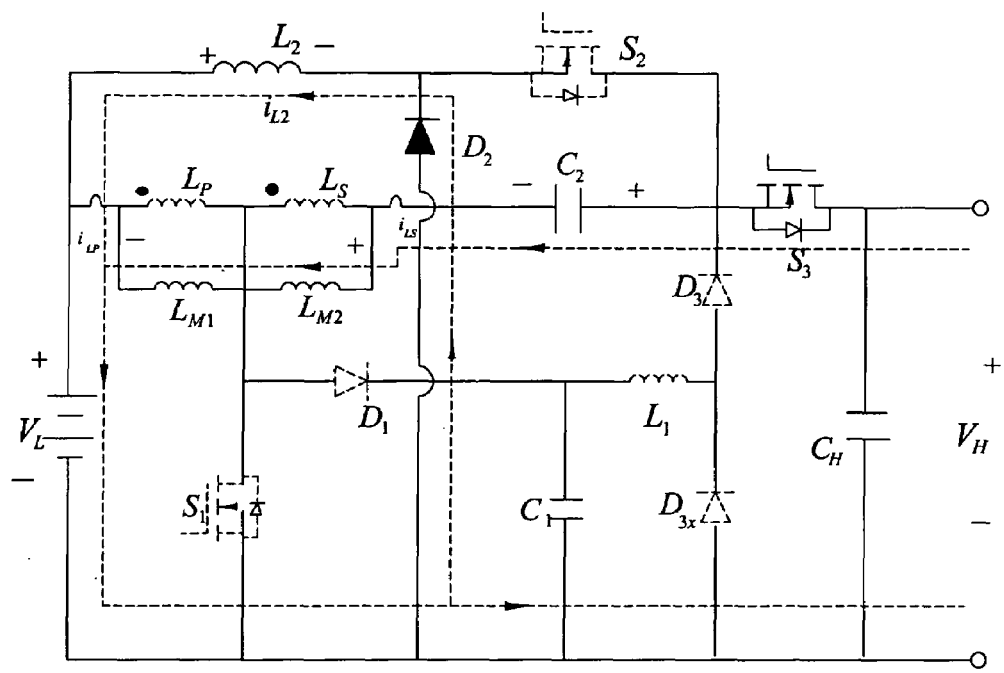

$L_1$: 7 µH $L_2$: 60 µH $C_1$: 22 µF/100v $C_2$: 10 µF/200V $D_1$, $D_2$ & $D_{3x}$: STPS20H100CT, 100V/2*10A (Schottky), TO-220AB $D_3$: SF1005G, 300V/16A, TO-220A To further understand the content of the present invention, please refer to FIG. 3(a) for following embodiment's waveform, voltage and current symbols of circuit components.

Figure 9:
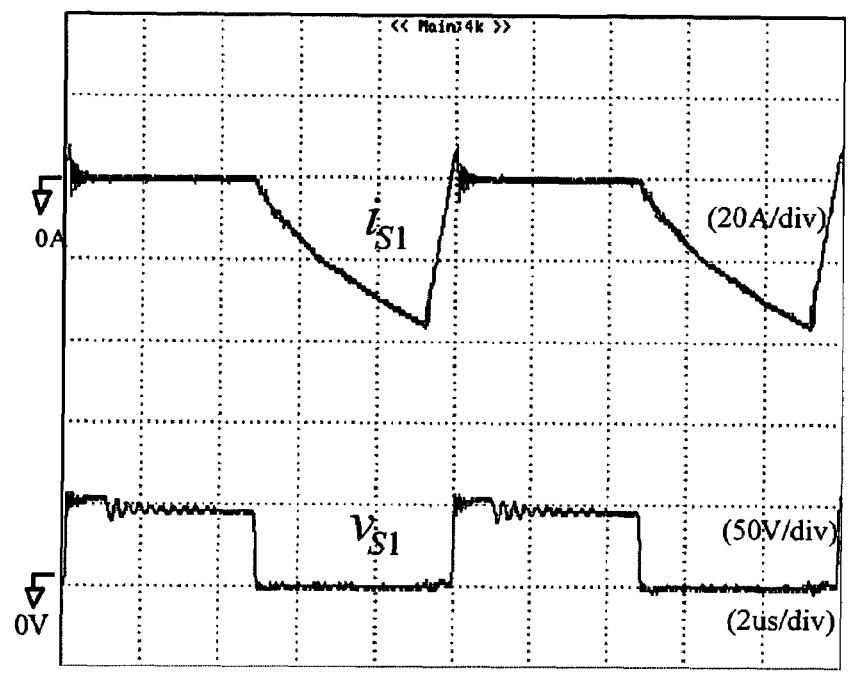
FIG. 9 is waveforms of each components, at high voltage circuit voltage $V_H$=200v, low voltage circuit voltage $V_H$=24v and output power is 300 w, of step-down portion circuit of the present invention.
Figure 9:
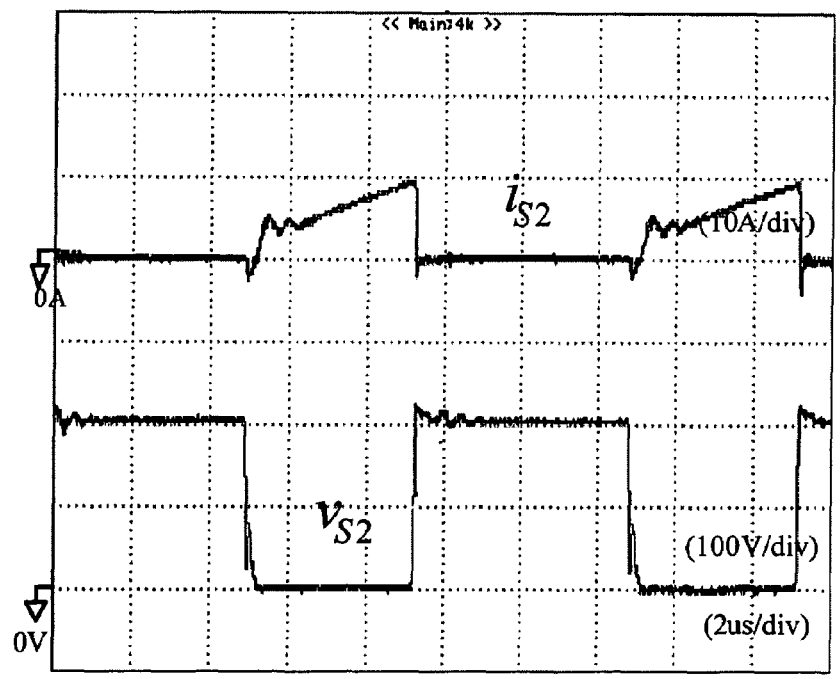

For step-down portion circuit of the present invention, when the high voltage circuit voltage $V_H$=200V, low voltage circuit voltage $V_L$=24V, and output power is 300 W, waveforms of circuit components are shown in FIG. 9. FIG. 9(a) shows voltage and current waveforms when low voltage switch $S_1$ is in synchronous rectification control; where its switch voltage $v_{DS1}$=50V matches theoretical analysis. FIG. 9(b) and (c) show voltage and current waveforms of step-down switch $S_2$ and high voltage switch $S_3$, respectively; according to the figures, both switches possess zero voltage switching characters when conducting, and when cutting off, voltage is clamped at about 200V. FIG. 9(d) shows the current waveform of two windings Lp and Ls of coupled inductor.

Figure 10:
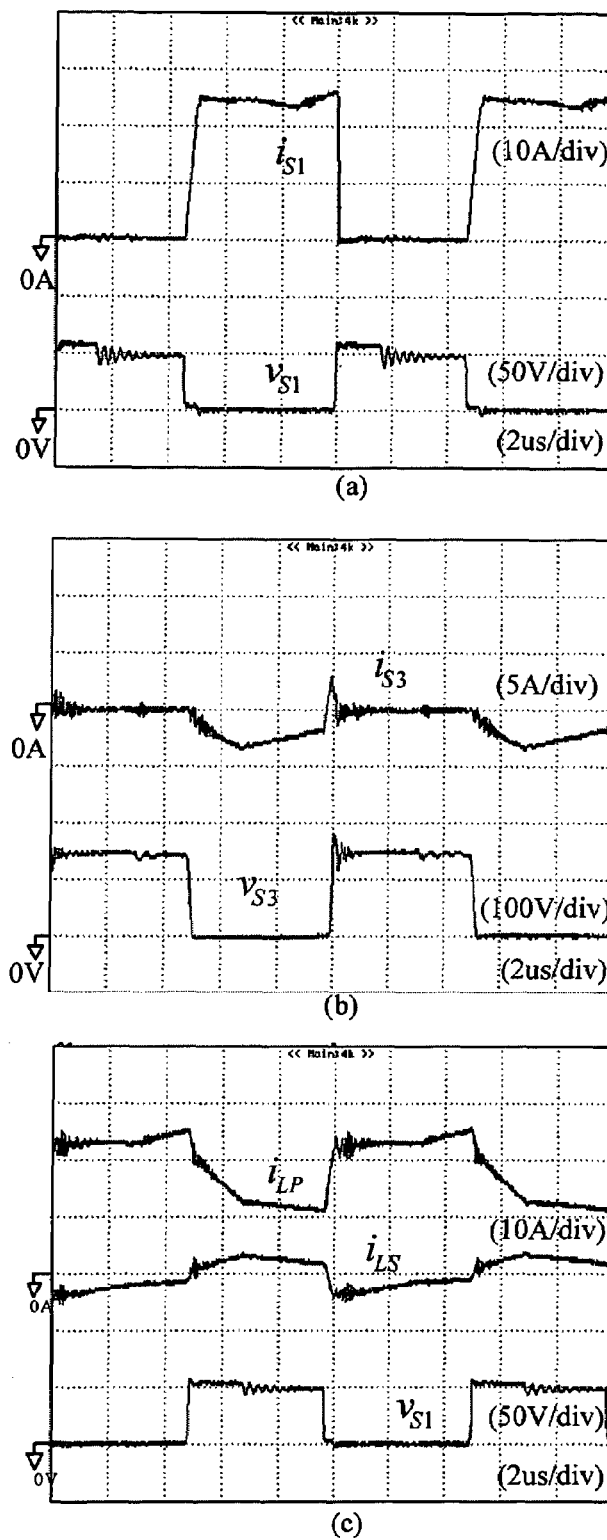
FIG. 10 is waveforms of each components, at high voltage circuit voltage $V_H$=200v, low voltage circuit voltage $V_H$=24v and output power is 300 w, of step-up portion circuit of the present invention.

For step-up portion circuit of the present invention, when the high voltage circuit voltage $V_H$=200V, low voltage circuit voltage $V_L$=24V, and output power is 300 W, waveforms of circuit components are shown in FIG. 10. FIG. 10(a) shows voltage and current waveforms of low voltage switch $S_1$, and its switch voltage $v_{DS1}$=55V matches theoretical analysis, where when conducting the current possesses zero current switching character and is close to square waveform with low harmonics. FIG. 10(b) shows voltage and current waveforms of high voltage switch $S_3$ when it is in synchronous rectification control, and the voltage is clamped to low than 200V. FIG. 10(c) shows the current waveform of two windings Lp and Ls of coupled inductor.

Figure 11:
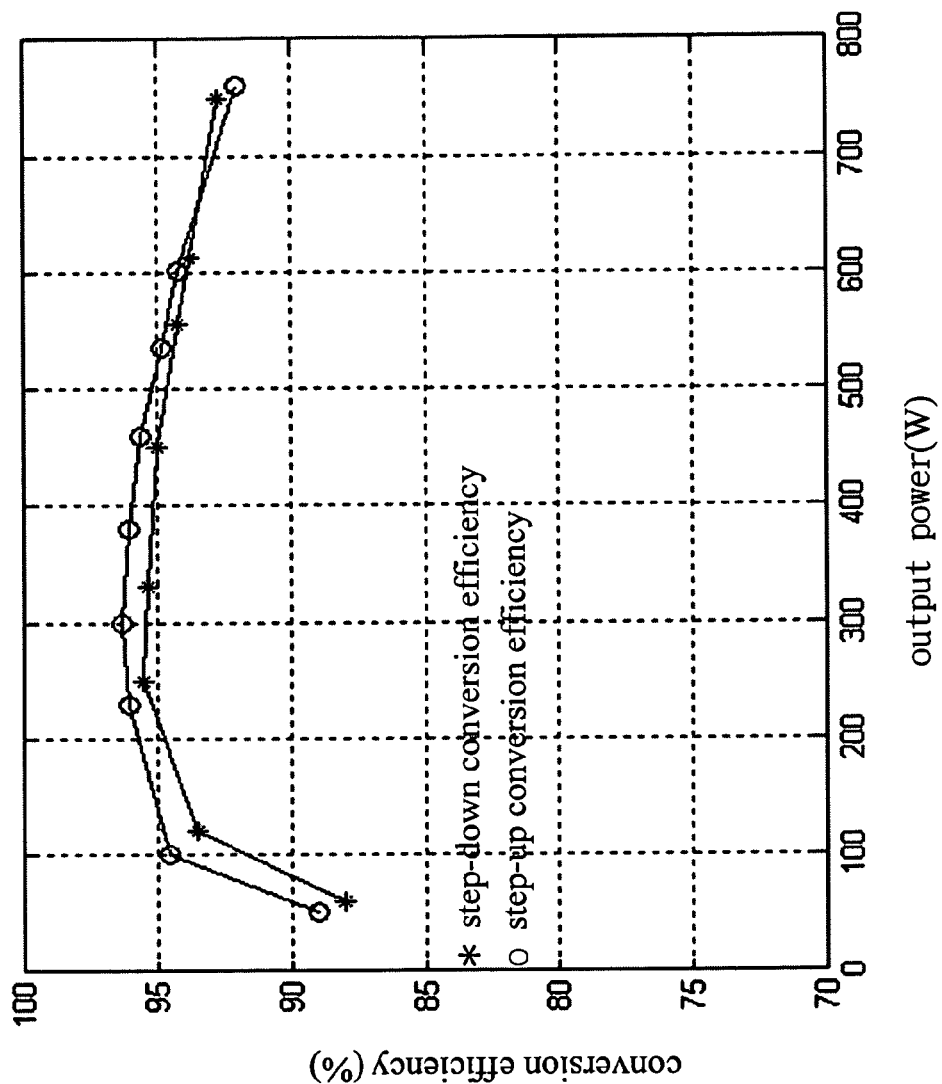
FIG. 11 is the measured conversion ratios of step-up and step down circuit of the present invention.

The conversion efficiencies of step-up and step-down circuit of the present invention are shown in FIG. 11, and maximum conversion efficiency for step-down is about 95.5% and maximum conversion efficiency for step-up is about 96%. At light load, the efficiency of step up is higher than that of step-down because the zero voltage switching of step-down circuit has higher circular current, while at heavy load the efficiency of step-up fairs less since most of energy transfer is done by low voltage switch $S_1$, causing conduction loss increase drastically.

Figure 12:
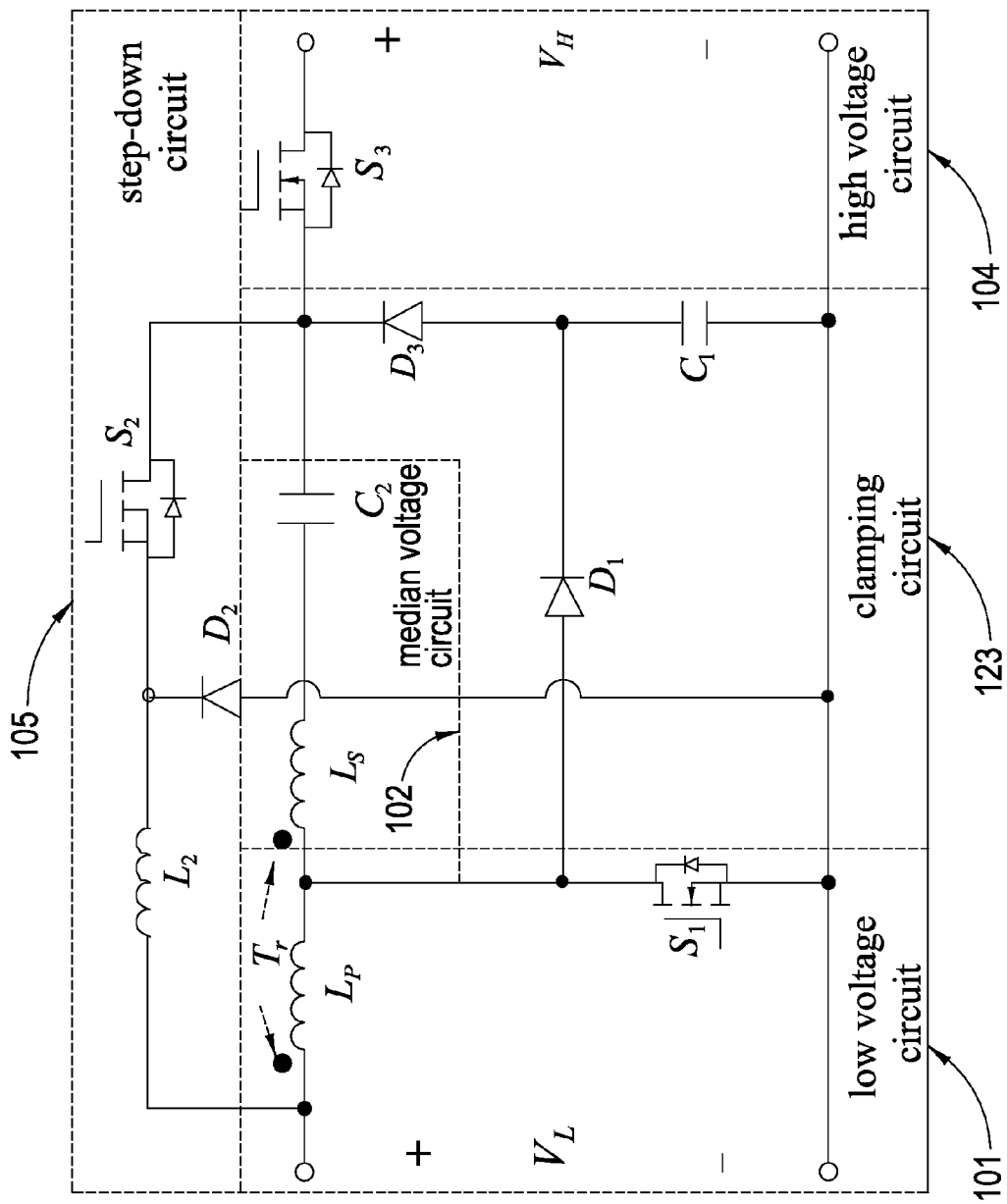
FIG. 12 is the second preferred embodiment of the present invention.
Figure 13:
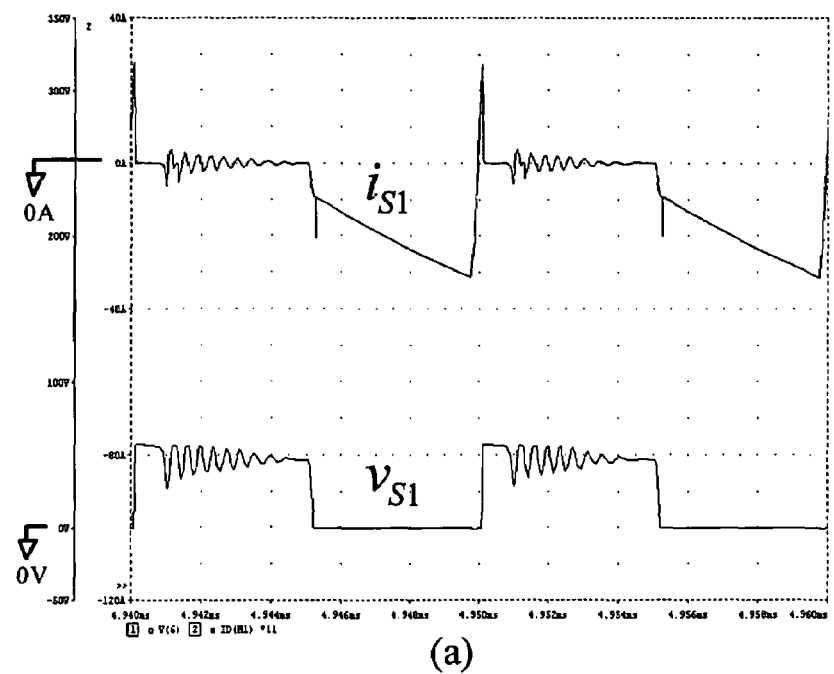
FIG. 13 is simulated response waveform of step-down portion of the second embodiment of the present invention.
Figure 13:
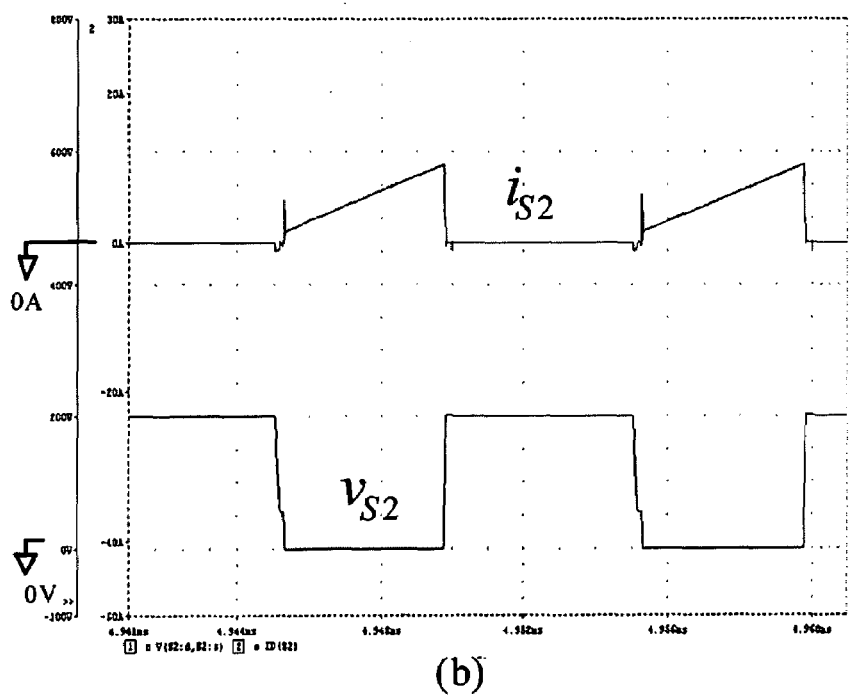
Figure 14:
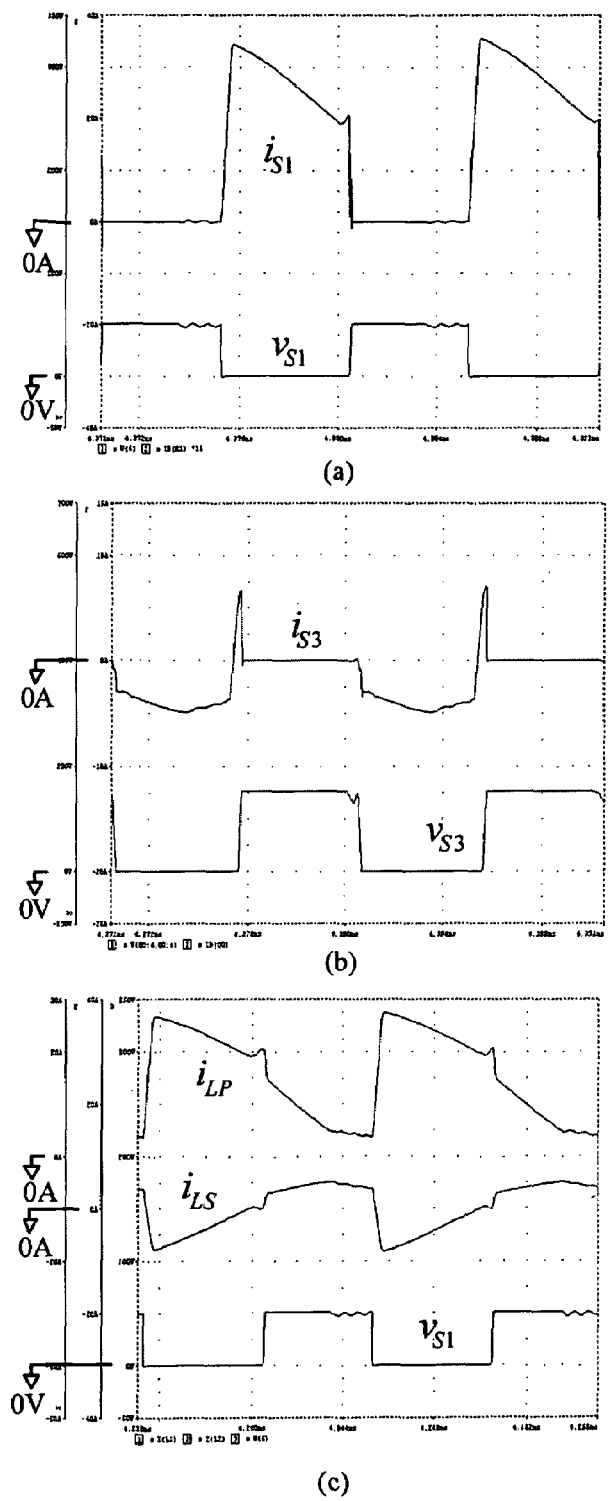
FIG. 14 is simulated response waveform of step-up portion of the second embodiment of the present invention.

The second preferred embodiment of the present invention is shown in FIG. 12. It has similar working theory to the first preferred embodiment, but clamping circuit 123 uses less components than clamping circuit 103, eliminating clamping inductor $L_1$ and third clamping diode $D_{3x}$. Using to the analysis of first preferred embodiment, at the same power output condition, simulated response waveforms of step-down circuit of second preferred embodiment of the present invention are shown in FIG. 13. Comparing FIG. 13 to FIG. 9, cut-off voltage of high voltage switch $S_3$ of FIG. 13(*c*) is $V_H - v_{C1}$, less than that of same switch of FIG. 9, such that a switch with lower voltage bearing can be used. However before step-down switch $S_2$ of FIG. 13(*b*) conducts, the voltage is raised to $v_{C1}$, only achieving near zero voltage switching; therefore, as to step-down, each embodiment has its own merit. Comparing performances of step-up portions of FIG. 14 and FIG. 10, clamping voltage effects of low voltage switch $S_1$ and high voltage switch $S_3$ of FIG. 14(*b*) and FIG. 14(*c*) is better than of FIG. 10(*a*) and FIG. 10(*b*), eliminating third clamping diode $D_{3x}$ and clamping inductor $L_1$, such that clamping capacitor voltage $v_{C1}$ can be released quickly, and supporting part of voltage when high voltage switch $S_3$ cuts off.

Many changes and modifications in the above-described embodiments of the present invention can, of course, be carried out without departing from the scope thereof. Accordingly, to promote the progress in science and the useful arts, the present invention is disclosed and is intended to be limited only by the scope of the appended claims.

What is claimed is:

1. A high efficiency high voltage gain bi-directional converter, comprising:
    a low voltage circuit including a low voltage switch and first winding of a coupled inductor; depending on the switch's on and off state, storing or releasing energy in the first winding of the coupled inductor;
    a median voltage circuit including second winding of the coupled inductor and a median voltage capacitor between the low voltage circuit and a high voltage circuit, mainly utilizing the median voltage capacitor to raise voltage boosting ratio or bear part of voltage during step down;
    a clamping circuit including a clamping inductor, a clamping capacitor, a first clamping diode, a second clamping diode and a third clamping diode, mainly to absorb leakage induction energy of the coupled inductor, protect the low voltage switch and release the absorbed energy to output end;
    the high voltage circuit including a high voltage switch, providing a passage for bi-directional energy transfer between the high voltage circuit and the low voltage circuit.

2. The converter as claimed in claim 1, wherein said coupled inductor is a double winding transformer with high air gap and high excited induction current;
    utilizing different winding ratios of the transformer to separate voltage and current range; on the low voltage side winding number is small but current is large, and on the high voltage side it is opposite.

3. The converter as claimed in claim 1, wherein said absorbed energy by the clamping circuit from the leakage induction of first winding of the coupled inductor can be used in voltage step-up or step-down, such that a high induction leakage transformer is acceptable and traditional two winding method is fine, and not limited to high coefficient sandwich winding method.

4. A High-efficiency high voltage gain bi-directional converter, comprising:
    a low voltage circuit including a low voltage switch and first winding of a coupled inductor; depending on the switch's on or off state, storing or releasing energy in the first winding of the coupled inductor;
    a median voltage circuit including second winding of the coupled inductor and a median voltage capacitor between the low voltage circuit and a high voltage circuit, mainly utilizing the median voltage capacitor to raise voltage boosting ratio or bear part of voltage during step down;
    a clamping circuit including a clamping capacitor, a first clamping diode and a second clamping diode, mainly to absorb leakage induction energy of the coupled inductor, protect the low voltage switch and release the absorbed energy to output end;
    the high voltage circuit including a high voltage switch, providing a passage for bi-directional energy transfer between the high voltage circuit and the low voltage circuit.

5. The converter as claimed in claim 4, wherein said coupled inductor is a double winding transformer with high air gap and high excited induction current;
    utilizing different winding ratios of the transformer to separate voltage and current range; on the low voltage side winding number is small but current is large, and on the high voltage side it is opposite.

6. The converter as claimed in claim 4, wherein said absorbed energy by the clamping circuit from the leakage induction of first winding of the coupled inductor can be used in voltage step-up or step-down, such that a high induction leakage transformer is acceptable and traditional two winding method is fine, and not limited to high coefficient sandwich winding method.

* * * * *